(12) United States Patent
O'Shea et al.

(10) Patent No.: US 10,772,052 B2
(45) Date of Patent: Sep. 8, 2020

(54) CONTROLLING COEXISTENT RADIO SYSTEMS IN A WIRELESS DEVICE

(71) Applicant: QUALCOMM Incorporated, San Diego, CA (US)

(72) Inventors: Helena Deirdre O'Shea, San Diego, CA (US); David Maldonado, Rancho Santa Fe, CA (US); Ramakrishna Narayanaswami, Palo Alto, CA (US); Chuan Wang, San Diego, CA (US); Wolfgang Roethig, Campbell, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/009,015

(22) Filed: Jun. 14, 2018

(65) Prior Publication Data
US 2018/0368082 A1    Dec. 20, 2018

Related U.S. Application Data

(60) Provisional application No. 62/521,358, filed on Jun. 16, 2017, provisional application No. 62/522,064, (Continued)

(51) Int. Cl.
*H04W 4/80* (2018.01)
*H04W 52/52* (2009.01)
(Continued)

(52) U.S. Cl.
CPC ............ *H04W 52/52* (2013.01); *H04B 1/406* (2013.01); *H04W 4/80* (2018.02);
(Continued)

(58) Field of Classification Search
CPC ... H04W 52/52; H04W 4/80; H04W 52/0251; H04W 72/1215; H04W 24/08;
(Continued)

(56) References Cited

U.S. PATENT DOCUMENTS 5,638,141 A * 6/1997 Bae ...................... H03G 3/3068
348/735
6,838,933 B2 * 1/2005 Goyette ................... H03F 3/19
330/254
(Continued)

FOREIGN PATENT DOCUMENTS

EP    2908599 A1    8/2015
EP    2999125 A1    3/2016
(Continued)

OTHER PUBLICATIONS

International Search Report and Written Opinion—PCT/US2018/037767—ISA/EPO—dated Nov. 11, 2018.
(Continued)

*Primary Examiner* — Hai V Nguyen
(74) *Attorney, Agent, or Firm* — Loza & Loza LLP

(57) ABSTRACT

Disclosed aspects relate to methods and apparatus for coexistent radio frequency (RF) systems in a wireless device. Control of a wireless device includes detecting when a turn on signal is issued to a first radio system, and then controlling the second radio system to either modify the operation of receiver circuitry in the second radio system to protect components within that system, or modify transmit circuitry to stop transmissions for protecting components within one radio system potentially affected by transmission from the other radio system in the wireless device. Disclosed also is monitoring of transmission states of the radio systems based on reading messages between the first and second radio systems and issuing a notification message based thereon such that one of the radio systems may suspend monitoring of a transmit channel for permission to transmit in order to reduce power consumption due to such monitoring of the channel.

55 Claims, 17 Drawing Sheets

Related U.S. Application Data filed on Jun. 19, 2017, provisional application No. 62/650,095, filed on Mar. 29, 2018.

(51) Int. Cl.

| | | |
|---|---|---|
| *H04B 1/403* | (2015.01) | |
| *H04W 52/02* | (2009.01) | |
| *H04W 72/12* | (2009.01) | |
| *H04W 88/06* | (2009.01) | |
| *H04W 24/08* | (2009.01) | |
| *H04W 72/04* | (2009.01) | |
| *H04W 84/12* | (2009.01) | |

(52) U.S. Cl.
CPC ... *H04W 52/0251* (2013.01); *H04W 72/1215* (2013.01); *H04W 24/08* (2013.01); *H04W 72/0453* (2013.01); *H04W 84/12* (2013.01); *H04W 88/06* (2013.01)

(58) Field of Classification Search
CPC . H04W 72/0453; H04W 84/12; H04W 88/06; H04B 1/406
USPC ........................................................ 455/522
See application file for complete search history.

(56) References Cited

U.S. PATENT DOCUMENTS

| | | | | |
|---|---|---|---|---|
| 7,054,605 B1* | 5/2006 | Groe | H03G 3/3068 | 455/232.1 |
| 7,257,380 B2* | 8/2007 | Darabi | H04B 1/0057 | 370/338 |
| 7,299,042 B2* | 11/2007 | Moore | H04W 48/10 | 370/329 |
| 7,477,108 B2* | 1/2009 | Ichitsubo | H03F 3/189 | 330/307 |
| 7,480,483 B2* | 1/2009 | Takano | H04H 20/02 | 455/3.02 |
| 7,675,359 B2* | 3/2010 | Vice | H03F 1/0277 | 330/124 D |
| 7,839,775 B2* | 11/2010 | Chan | H04L 1/0001 | 370/230 |
| 7,844,234 B2* | 11/2010 | Walia | H03F 1/305 | 330/129 |
| 7,925,227 B2* | 4/2011 | Ichitsubo | H04B 1/44 | 455/114.1 |
| 8,040,815 B2* | 10/2011 | Silk | H04W 16/14 | 370/252 |
| 8,055,230 B1* | 11/2011 | Bidichandani | H03G 3/3078 | 455/226.1 |
| 8,121,573 B2* | 2/2012 | Haralabidis | H04B 1/0475 | 455/255 |
| 8,165,544 B2* | 4/2012 | Tran | H04B 1/006 | 455/132 |
| 8,208,867 B2* | 6/2012 | Lum | H04B 1/48 | 455/78 |
| 8,213,878 B1* | 7/2012 | Robbins | H04B 1/406 | 370/329 |
| 8,254,866 B1* | 8/2012 | Bidichandani | H03G 3/3078 | 455/226.1 |
| 8,315,234 B2* | 11/2012 | Sohrabi | H04W 72/1242 | 370/338 |
| 8,346,196 B2* | 1/2013 | Haralabidis | H04B 1/0475 | 455/255 |
| 8,364,080 B2* | 1/2013 | Desai | H04W 16/14 | 455/41.2 |
| 8,401,505 B1* | 3/2013 | Bidichandani | H03G 3/3078 | 455/226.1 |
| 8,433,326 B2* | 4/2013 | Brandstetter | H04W 16/14 | 455/446 |
| 8,489,022 B1* | 7/2013 | Gao | H04W 72/02 | 455/41.2 |
| 8,521,198 B2* | 8/2013 | Ciccarelli | H03F 3/72 | 455/501 |
| 8,559,383 B2* | 10/2013 | Zetterman | H04W 72/1215 | 370/310 |
| 8,588,687 B2* | 11/2013 | Ramey | A61B 5/14532 | 455/41.2 |
| 8,625,566 B1* | 1/2014 | Husted | H04B 1/406 | 370/339 |
| 8,666,317 B2* | 3/2014 | Choudhury | H04W 16/14 | 455/62 |
| 8,666,338 B2* | 3/2014 | Zhao | H03F 3/195 | 455/127.1 |
| 8,706,065 B2* | 4/2014 | Tran | H04W 88/06 | 455/132 |
| 8,707,392 B2* | 4/2014 | Birtwhistle | H04W 12/003 | 726/3 |
| 8,750,926 B2* | 6/2014 | Fu | H04W 36/0005 | 455/553.1 |
| 8,755,756 B1* | 6/2014 | Zhang | H04B 1/109 | 455/114.2 |
| 8,768,276 B1* | 7/2014 | Bidichandani | H03G 3/3078 | 455/226.1 |
| 8,868,069 B2* | 10/2014 | Bennett | H04W 84/005 | 455/431 |
| 8,953,506 B2* | 2/2015 | Sohrabi | H04W 72/1242 | 370/287 |
| 8,958,456 B2* | 2/2015 | Nagai | H04W 72/02 | 375/133 |
| 8,995,553 B2* | 3/2015 | Chen | H04L 5/0064 | 375/267 |
| 9,049,042 B2* | 6/2015 | Tagg | H04L 12/2856 | |
| 9,093,967 B2* | 7/2015 | Gorbachov | H03F 1/565 | |
| 9,148,233 B2* | 9/2015 | Haralabidis | H04B 1/0475 | |
| 9,209,855 B2* | 12/2015 | Tran | H04W 52/287 | |
| 9,210,535 B2* | 12/2015 | Kheirkhahi | H04B 1/525 | |
| 9,232,443 B2* | 1/2016 | Fu | H04B 1/406 | |
| 9,241,368 B2* | 1/2016 | Desai | H04W 16/14 | |
| 9,312,929 B2* | 4/2016 | Forenza | H04B 7/024 | |
| 9,319,017 B1* | 4/2016 | Bidichandani | H03G 3/3078 | |
| 9,351,299 B2* | 5/2016 | Kazmi | H04W 16/14 | |
| 9,400,192 B1* | 7/2016 | Salser, Jr. | G01D 4/002 | |
| 9,445,275 B2* | 9/2016 | Chen | H04L 5/0064 | |
| 9,473,085 B2* | 10/2016 | Lakdawala | H04B 1/0053 | |
| 9,504,056 B2* | 11/2016 | Desai | H04W 72/1215 | |
| 9,532,243 B2* | 12/2016 | Kim | H04W 24/02 | |
| 9,537,642 B2* | 1/2017 | Belghoul | H04W 28/085 | |
| 9,543,900 B1* | 1/2017 | Lin | H04B 1/0458 | |
| 9,549,324 B2* | 1/2017 | Birtwhistle | H04W 12/08 | |
| 9,572,052 B2* | 2/2017 | King | H04B 1/0475 | |
| 9,602,313 B1* | 3/2017 | Jalloul | H04L 1/00 | |
| 9,647,703 B2* | 5/2017 | Sun | H03F 1/565 | |
| 9,698,838 B1* | 7/2017 | Sen | H04B 1/1027 | |
| 9,748,991 B2* | 8/2017 | Liao | H04B 1/006 | |
| 9,756,639 B2* | 9/2017 | Sebire | H04L 5/001 | |
| 9,781,735 B2* | 10/2017 | Comsa | H04W 72/1215 | |
| 9,853,797 B2* | 12/2017 | Tabet | H04W 28/085 | |
| 9,936,442 B1* | 4/2018 | Noonan | B01J 35/1019 | |
| 9,961,696 B2* | 5/2018 | Wang | H04W 72/1215 | |
| 9,991,918 B2* | 6/2018 | King | H04B 1/0475 | |
| 10,014,889 B2* | 7/2018 | King | H04B 1/1638 | |
| 10,038,418 B1* | 7/2018 | Ayranci | H03G 3/3036 | |
| 10,039,148 B2* | 7/2018 | Singh | H04W 76/15 | |
| 10,051,477 B2* | 8/2018 | Nielsen | H04W 76/30 | |
| 10,147,990 B2* | 12/2018 | Cebi | H03F 3/245 | |
| 10,200,183 B2* | 2/2019 | Liu | H04L 5/1461 | |
| 10,206,140 B2* | 2/2019 | Gupta | H04W 16/14 | |
| 10,224,977 B2* | 3/2019 | Sun | H03F 1/565 | |
| 10,277,290 B2* | 4/2019 | Forenza | H04B 7/024 | |
| 10,340,961 B2* | 7/2019 | King | H04B 1/1638 | |
| 10,587,329 B2* | 3/2020 | Maldonado | H04B 7/0811 | |
| 2004/0066230 A1* | 4/2004 | Goyette | H03F 3/19 | 330/51 |
| 2004/0152432 A1* | 8/2004 | Gu | H03G 3/3068 | 455/136 |
| 2005/0248402 A1* | 11/2005 | Zhenbiao | H03F 3/72 | 330/129 |

(56) References Cited

U.S. PATENT DOCUMENTS

| | | | | |
|---|---|---|---|---|
| 2006/0030265 A1* | 2/2006 | Desai | H04W 72/1215 | 455/41.2 |
| 2006/0030266 A1* | 2/2006 | Desai | H04W 84/12 | 455/41.2 |
| 2006/0068747 A1* | 3/2006 | Brobston | H03G 3/3068 | 455/324 |
| 2006/0126754 A1* | 6/2006 | Filimonov | H03F 1/0277 | 375/296 |
| 2006/0170492 A1* | 8/2006 | Sheng-Fuh | H03F 1/56 | 330/129 |
| 2006/0217059 A1* | 9/2006 | Takano | H04H 40/27 | 455/3.02 |
| 2006/0221992 A1* | 10/2006 | Chan | H04L 1/0001 | 370/445 |
| 2007/0262817 A1 | 11/2007 | Ciccarelli et al. | | |
| 2008/0012645 A1* | 1/2008 | Ichitsubo | H03F 3/189 | 330/307 |
| 2008/0043705 A1* | 2/2008 | Desai | H04W 72/1215 | 370/346 |
| 2008/0045162 A1* | 2/2008 | Rofougaran | H04B 17/19 | 455/73 |
| 2008/0153451 A1* | 6/2008 | Knecht | H05K 1/141 | 455/349 |
| 2008/0247445 A1 | 10/2008 | Guo et al. | | |
| 2008/0299987 A1* | 12/2008 | Iyer | H04W 16/10 | 455/454 |
| 2009/0036065 A1* | 2/2009 | Siu | H03F 1/223 | 455/78 |
| 2009/0063740 A1* | 3/2009 | Yeh | H04W 72/1215 | 710/113 |
| 2009/0075608 A1* | 3/2009 | Ichitsubo | H04B 1/44 | 455/127.2 |
| 2009/0081962 A1* | 3/2009 | Sohrabi | H04W 72/1242 | 455/79 |
| 2009/0135767 A1* | 5/2009 | Silk | H04W 16/14 | 370/329 |
| 2009/0170453 A1* | 7/2009 | Walia | H03F 3/245 | 455/127.1 |
| 2009/0207764 A1* | 8/2009 | Fukamachi | H04B 1/44 | 370/297 |
| 2009/0239471 A1* | 9/2009 | Tran | H04W 88/06 | 455/41.2 |
| 2009/0295472 A1* | 12/2009 | Vice | H03F 3/505 | 330/51 |
| 2010/0008338 A1* | 1/2010 | Tsfati | H04B 1/406 | 370/338 |
| 2010/0040184 A1* | 2/2010 | Haralabidis | H04B 15/06 | 375/373 |
| 2010/0260082 A1* | 10/2010 | Lum | H04B 1/0057 | 370/297 |
| 2010/0304685 A1 | 12/2010 | Wietfeldt et al. | | |
| 2010/0316027 A1* | 12/2010 | Rick | H04B 1/406 | 370/336 |
| 2011/0003563 A1* | 1/2011 | Gorbachov | H01Q 21/0025 | 455/78 |
| 2011/0007675 A1* | 1/2011 | Chiou | H04B 1/44 | 370/297 |
| 2011/0096705 A1* | 4/2011 | Kemmochi | H04B 1/006 | 370/297 |
| 2011/0122829 A1* | 5/2011 | Zetterman | H04W 72/1215 | 370/329 |
| 2011/0222419 A1* | 9/2011 | Callaway, Jr. | H04W 52/0261 | 370/252 |
| 2011/0249603 A1* | 10/2011 | Rick | H04B 1/40 | 370/311 |
| 2011/0267966 A1* | 11/2011 | Gao | H04W 28/22 | 370/252 |
| 2011/0312288 A1* | 12/2011 | Fu | H04B 1/406 | 455/88 |
| 2012/0009886 A1 | 1/2012 | Poulin et al. | | |
| 2012/0034870 A9* | 2/2012 | Desai | H04W 16/14 | 455/41.2 |
| 2012/0034913 A1* | 2/2012 | Wang | H04W 16/14 | 455/426.1 |
| 2012/0040620 A1* | 2/2012 | Fu | H04B 1/525 | 455/63.1 |
| 2012/0077532 A1* | 3/2012 | Kadous | H04W 16/14 | 455/507 |
| 2012/0082140 A1* | 4/2012 | Lin | H04W 74/085 | 370/336 |
| 2012/0092714 A1* | 4/2012 | Suzuki | H04M 1/7253 | 358/1.15 |
| 2012/0093037 A1* | 4/2012 | Thubert | H04W 40/08 | 370/255 |
| 2012/0095311 A1* | 4/2012 | Ramey | H04W 72/1215 | 600/365 |
| 2012/0169537 A1* | 7/2012 | Danilenko | G01S 19/34 | 342/357.63 |
| 2012/0201234 A1* | 8/2012 | Tran | H04B 1/006 | 370/338 |
| 2012/0207040 A1* | 8/2012 | Comsa | H04W 72/1215 | 370/252 |
| 2012/0236766 A1* | 9/2012 | Haralabidis | H04B 1/0475 | 370/280 |
| 2012/0266251 A1* | 10/2012 | Birtwhistle | H04W 12/003 | 726/26 |
| 2012/0280754 A1* | 11/2012 | Gorbachov | H03H 7/1741 | 330/302 |
| 2013/0003617 A1* | 1/2013 | Gudem | H04B 1/525 | 370/277 |
| 2013/0029613 A1* | 1/2013 | Haralabidis | H04B 1/0475 | 455/75 |
| 2013/0064155 A1* | 3/2013 | Sohrabi | H04W 72/1242 | 370/311 |
| 2013/0078924 A1* | 3/2013 | Choudhury | H04W 16/14 | 455/62 |
| 2013/0121329 A1* | 5/2013 | Desai | H04W 84/12 | 370/338 |
| 2013/0165134 A1* | 6/2013 | Touag | H04W 16/14 | 455/452.1 |
| 2013/0190036 A1* | 7/2013 | Zhao | H03F 3/245 | 455/550.1 |
| 2013/0207732 A1* | 8/2013 | Cabanillas | H03F 1/347 | 330/307 |
| 2013/0214862 A1* | 8/2013 | Presti | H03F 1/0211 | 330/151 |
| 2013/0237260 A1* | 9/2013 | Lin | H04B 1/1036 | 455/501 |
| 2013/0259016 A1* | 10/2013 | Xhafa | H04W 4/80 | 370/338 |
| 2013/0324070 A1* | 12/2013 | Bennett | H04W 84/005 | 455/404.1 |
| 2013/0324112 A1* | 12/2013 | Jechoux | H04W 72/1215 | 455/426.1 |
| 2013/0329821 A1* | 12/2013 | Chen | H04B 7/0413 | 375/267 |
| 2013/0331043 A1* | 12/2013 | Perumana | H04B 1/525 | 455/78 |
| 2014/0035675 A1* | 2/2014 | Wagner | H03F 3/195 | 330/278 |
| 2014/0056288 A1* | 2/2014 | Wyper | H04W 72/1215 | 370/336 |
| 2014/0099893 A1* | 4/2014 | Kheirkhahi | H04J 11/0023 | 455/41.2 |
| 2014/0187249 A1* | 7/2014 | Fu | H04B 1/406 | 455/443 |
| 2014/0197886 A1* | 7/2014 | Rangarajan | H03G 1/0029 | 330/251 |
| 2014/0221028 A1* | 8/2014 | Desai | H04B 10/693 | 455/501 |
| 2014/0227984 A1* | 8/2014 | Tran | H04B 1/48 | 455/78 |
| 2014/0230021 A1* | 8/2014 | Birtwhistle | H04W 12/003 | 726/4 |
| 2014/0287794 A1* | 9/2014 | Akhi | H01Q 21/0006 | 455/550.1 |
| 2014/0293912 A1* | 10/2014 | Chao | H04L 5/0078 | 370/329 |

(56) References Cited

U.S. PATENT DOCUMENTS

| | | | | |
|---|---|---|---|---|
| 2015/0011233 A1* | | 1/2015 | Kazmi | H04W 72/044 455/454 |
| 2015/0031288 A1* | | 1/2015 | Tubbesing | H04W 4/80 455/41.1 |
| 2015/0181583 A1* | | 6/2015 | Siomina | H04W 72/044 370/330 |
| 2015/0208253 A1* | | 7/2015 | Kim | H04W 24/02 370/252 |
| 2015/0222410 A1* | | 8/2015 | Belghoul | H04B 1/715 370/252 |
| 2015/0223243 A1* | | 8/2015 | Tabet | H04L 5/001 370/330 |
| 2015/0237583 A1 | | 8/2015 | Hassan et al. | |
| 2015/0237643 A1* | | 8/2015 | Tsunoda | H04W 72/10 370/329 |
| 2015/0249479 A1* | | 9/2015 | Nobbe | H03F 1/301 455/77 |
| 2015/0257011 A1* | | 9/2015 | Chen | H04B 7/0413 455/501 |
| 2015/0270813 A1* | | 9/2015 | Morshedi | H04B 17/19 455/144 |
| 2015/0305039 A1* | | 10/2015 | Sebire | H04W 72/0453 370/329 |
| 2015/0333791 A1* | | 11/2015 | Anderson | H04B 1/48 455/83 |
| 2015/0349770 A1* | | 12/2015 | Bakalski | H03K 17/16 455/78 |
| 2016/0037544 A1* | | 2/2016 | Wang | H04W 72/1215 370/329 |
| 2016/0044677 A1* | | 2/2016 | King | H04B 1/40 455/450 |
| 2016/0072441 A1* | | 3/2016 | Lakdawala | H03F 1/0261 455/78 |
| 2016/0080011 A1* | | 3/2016 | Sun | H03F 1/565 455/114.2 |
| 2016/0080012 A1* | | 3/2016 | Sun | H03F 3/24 455/114.2 |
| 2016/0128071 A1 | | 5/2016 | Ngai et al. | |
| 2016/0174280 A1* | | 6/2016 | Singh | H04W 76/15 370/329 |
| 2016/0241285 A1* | | 8/2016 | Rafi | H04B 1/28 |
| 2016/0301369 A1* | | 10/2016 | Heaney | H03F 3/72 |
| 2016/0345311 A1* | | 11/2016 | Chen | H04W 72/0446 |
| 2016/0373064 A1* | | 12/2016 | Lin | H04W 4/80 |
| 2017/0048838 A1* | | 2/2017 | Chrisikos | H04W 48/16 |
| 2017/0063574 A1* | | 3/2017 | Jalloul | H04J 11/0023 |
| 2017/0086076 A1* | | 3/2017 | Sadek | H04W 76/28 |
| 2017/0105219 A1* | | 4/2017 | Sebire | H04L 5/0032 |
| 2017/0111066 A1* | | 4/2017 | King | H04W 24/02 |
| 2017/0111074 A1* | | 4/2017 | King | H04B 1/0475 |
| 2017/0164208 A1* | | 6/2017 | Nielsen | H04W 16/14 |
| 2017/0187405 A1* | | 6/2017 | Sen | H04B 1/1027 |
| 2017/0230075 A1* | | 8/2017 | Sun | H04B 1/005 |
| 2017/0279415 A1 | | 9/2017 | Wallis | |
| 2017/0279416 A1 | | 9/2017 | Maxim et al. | |
| 2017/0290037 A1* | | 10/2017 | Goel | H04W 16/14 |
| 2017/0325199 A1* | | 11/2017 | Hirsch | H04W 72/1215 |
| 2017/0328997 A1* | | 11/2017 | Silverstein | G01S 13/06 |
| 2017/0367107 A1* | | 12/2017 | Comsa | H04W 72/1215 |
| 2017/0373819 A1* | | 12/2017 | Liu | H04L 5/0028 |
| 2018/0019710 A1 | | 1/2018 | Ayranci et al. | |
| 2018/0048077 A1 | | 2/2018 | Zhang et al. | |
| 2018/0062231 A1* | | 3/2018 | Cebi | H03F 3/602 |
| 2018/0062599 A1* | | 3/2018 | Lee | H03G 3/001 |
| 2018/0084419 A1* | | 3/2018 | Sun | H04L 9/08 |
| 2018/0124643 A1* | | 5/2018 | Gupta | H04W 48/18 |
| 2018/0234764 A1* | | 8/2018 | Gabai | H04R 3/00 |
| 2018/0249420 A1* | | 8/2018 | Lim | H04W 52/36 |
| 2018/0262233 A1* | | 9/2018 | Laselva | H04B 1/005 |
| 2018/0279226 A1* | | 9/2018 | Lim | H04W 52/36 |
| 2018/0352473 A1* | | 12/2018 | Gunasekara | H04W 48/16 |
| 2018/0357199 A1* | | 12/2018 | Mishra | G06F 13/24 |
| 2018/0367173 A1* | | 12/2018 | King | H04B 1/0475 |
| 2019/0075552 A1* | | 3/2019 | Yu | H04W 48/20 |
| 2019/0089498 A1* | | 3/2019 | Pelletier | H04W 72/042 |
| 2019/0097715 A1* | | 3/2019 | Maldonado | H04B 7/0811 |
| 2019/0104551 A1* | | 4/2019 | Deenoo | H04W 72/0446 |
| 2019/0182694 A1* | | 6/2019 | Martin | H04W 24/10 |
| 2019/0245577 A1* | | 8/2019 | Sun | H04B 1/0483 |
| 2019/0273475 A1* | | 9/2019 | Ye | H03F 1/26 |

FOREIGN PATENT DOCUMENTS

| | | |
|---|---|---|
| WO | 2011123527 A1 | 10/2011 |
| WO | 2016060809 A1 | 4/2016 |
| WO | WO-2016204926 A1 | 12/2016 |

OTHER PUBLICATIONS

Partial International Search Report—PCT/US2018/037767—ISA/EPO—dated Sep. 25, 2018.

* cited by examiner

CONTROLLING COEXISTENT RADIO SYSTEMS IN A WIRELESS DEVICE

PRIORITY CLAIM

This application claims priority to and the benefit of Provisional Patent Application No. 62/521,358, filed in the United States Patent and Trademark Office on Jun. 16, 2017, Provisional Patent Application No. 62/522,064 filed in the United States Patent and Trademark Office on Jun. 19, 2017, and Provisional Patent Application No. 62/650,095 filed in the United States Patent and Trademark Office on Mar. 29, 2018, the entire contents of which are incorporated herein by reference as if fully set forth below in their entirety and for all applicable purposes.

BACKGROUND

Field

The subject matter disclosed herein relates to control of wireless devices, and more particularly to methods and apparatus for controlling and improving radio frequency (RF) systems concurrency or coexistence of two or more disparate radio systems in a wireless device.

Background

Increasingly, wireless devices implement various wireless technologies coexistent in the same wireless device where multiple radios coexist in the device and may operate concurrently in the same or close radio frequency (RF) bands. As one example of coexistent technologies, the 3rd Generation Partnership Project (3GPP) as part of Long Term Evolution (LTE) has adopted Licensed-Assisted Access or Licensed Anchor Assisted (LAA) technology that utilizes carrier aggregation in the downlink to combine LTE in unlicensed spectrum (e.g., LAA or LTE-U) (e.g., 5 GHz band) along with LTE in the licensed band as a persistent anchor channel.

In more recent developments, wireless devices may have the ability to also concurrently support a Wireless Local Area Network (WLAN) such as WiFi with a wireless wide area network (WWAN) including LAA or LTE-U concurrently active in the same RF band, such as the unlicensed 5 GHz band. When supporting transmits, LAA is called enhanced LAA (eLAA). It is noted, however, that in such systems the 5 GHz WiFi and the eLAA radios may be asynchronous such that interference between both systems may occur and cause damage to receiver path components such as low noise amplifiers (LNAs) in the concurrent radios of the device, especially if a particular antenna port isolation level cannot be guaranteed (e.g., ≥20 dB antenna separation). In such case, WLAN transmissions in the 5 GHz RF band, for example, may saturate LNAs and RF receive path components that may be active concurrently for other receive activities, such as for receive in LTE-U/LAA radios. There is a similar problem when other technologies transmit in certain bands, such as in the E-UTRA Band 47, for example, and the WLAN is actively receiving or transmitting. In such case, the WLAN infrastructure may be damaged as the WWAN transmit Tx channel for shared spectrum (e.g., LAA/C-V2X in Bands 46/47) can saturate the WLAN LNA if the WWAN is left operating in a receive Rx mode during the transmit Tx activity. More recently, new issues with damage due to coexistent radio systems similar to those of WLAN and LAA coexistence may further be seen in 5G and LTE as well. Such damage may be mitigated with switches, but such switches introduce front end losses and are only useful on those ports that have transmit (Tx) support. Additionally, filters may also be used for protection, but filters nonetheless may prevent full use of the relevant RF bands by both technologies. Accordingly, a need exists for controlling radio frequency concurrency in wireless devices to provide further protection for concurrent radios in a wireless device.

Additionally, it is noted that coexistence between WLAN and WWAN (e.g., LAA) can lead to both radio systems concurrently monitoring and analyzing a wireless link or channel to determine if it is potentially clear for transmission. This persistent monitoring by both radio systems of transmit (Tx) on the wireless links may lead to higher power consumption.

SUMMARY

According to an aspect of the present disclosure, a method for controlling a wireless device including coexistent radio frequency (RF) first and second radio systems is disclosed. The method includes detecting within a control logic circuitry when a turn on signal is issued to the first radio system to transmit signals with a transmit circuitry in the first radio system. Further, the method incudes modifying, changing, or adjusting the operation of the second radio system with the control logic circuity, where the modification includes at least one of modifying the operation of a receiver circuitry in the second radio system or modifying the operation of a transmit circuitry in the second radio system. In this manner, control of the coexistent systems to avoid concurrent deleterious transmissions, for example, may be effectuated.

According to another aspect, a wireless device operable with coexistent radio frequency (RF) first and second radio systems is disclosed. The device includes control logic circuitry configured to receive at least one turn on signal issued by a transceiver in the device to turn on at least a transmit circuitry of the first radio system. Additionally, the control logic circuitry is configured to control at least one of a receiver circuitry or a transmit circuitry in the second radio system when the at least one turn on signal is issued to turn on at least the transmit circuitry of the first radio system.

In another aspect, a wireless device operable with coexistent radio frequency (RF) first and second radio systems is disclosed. The device includes means for receiving at least one turn on signal issued by a transceiver in the device to turn on at least a transmit circuitry of the first radio system. Additionally, the wireless device includes means for controlling at least one of a receiver circuitry or a transmit circuitry in the second radio system when the at least one turn on signal is issued to turn on at least the transmit circuitry of the first radio system.

According a further aspect, a non-transitory computer-readable medium storing computer-executable code comprising code is disclosed. The code causes a computer to trigger a control logic circuitry configured to control at least one of a receive circuitry or a transmit circuitry in a first radio system within a wireless device having multiple coexistent RF radio systems, wherein the trigger comprises at least one turn on signal issued to the control logic circuitry to turn on at least a transmit circuitry of a second radio system.

According to still another aspect, a method for controlling a wireless device including coexistent first and second radio system is disclosed. The method includes controlling the first and second radio systems to avoid damage from each other during transmissions on at least one channel sharing a frequency spectrum between the first and second radio systems. Moreover, control of the first or second radio system includes determining whether at least one of the first or second radio systems is transmitting on at least one channel by reading control messages or information messages sent between the first and second radio systems within the wireless device. Additionally, based on the determination that one of the first or second radio system is transmitting or about to transmit, a notification message is sent to at least one of the first radio system or the second radio system that is monitoring the at least one channel for requesting transmission on the at least one channel, the notification message configured to indicate that the other radio system is currently transmitting on the at least one channel.

In yet another aspect, a wireless device operable with coexistent radio frequency (RF) first and second radio systems is disclosed. The device includes processing circuitry configured to determine whether at least one of the first or second radio systems is transmitting on at least one channel by reading control messages or information messages sent between the first and second radio systems within the wireless device. Further, the processing circuitry is configured to send a notification message, based on the determination that one of the first or second radio system is transmitting or about to transmit, to at least one of the first radio system or the second radio system that is monitoring the at least one channel for requesting transmission on the at least one channel, the notification message configured to indicate that the other radio system is currently transmitting on the at least one channel.

In still a further aspect, an apparatus for controlling a wireless device including coexistent first and second radio systems is disclosed. The apparatus include means for determining whether at least one of the first or second radio systems is transmitting on at least one channel by reading control messages or information messages sent between the first and second radio systems within the wireless device. Also, the device includes means for sending a notification message based on the determination that one of the first or second radio system is transmitting or about to transmit to at least one of the first radio system or the second radio system that is monitoring the at least one channel for requesting transmission on the at least one channel, the notification message configured to indicate that the other radio system is currently transmitting on the at least one channel.

In yet one further aspect, a non-transitory computer-readable medium storing computer-executable code is disclosed, the code for causing a computer to control first and second coexistent radio systems in a wireless device to avoid damage from each other during transmissions on at least one channel sharing a frequency spectrum between the first and second radio systems. The control includes determining whether at least one of the first or second radio systems is transmitting on at least one channel by reading control messages or information messages sent between the first and second radio systems within the wireless device. Additionally, based on the determination that one of the first or second radio system is transmitting or about to transmit, sending a notification message to at least one of the first radio system or the second radio system that is monitoring the at least one channel for requesting transmission on the at least one channel, the notification message configured to indicate that the other radio system is currently transmitting on the at least one channel.

DETAILED DESCRIPTION

Figure 1:
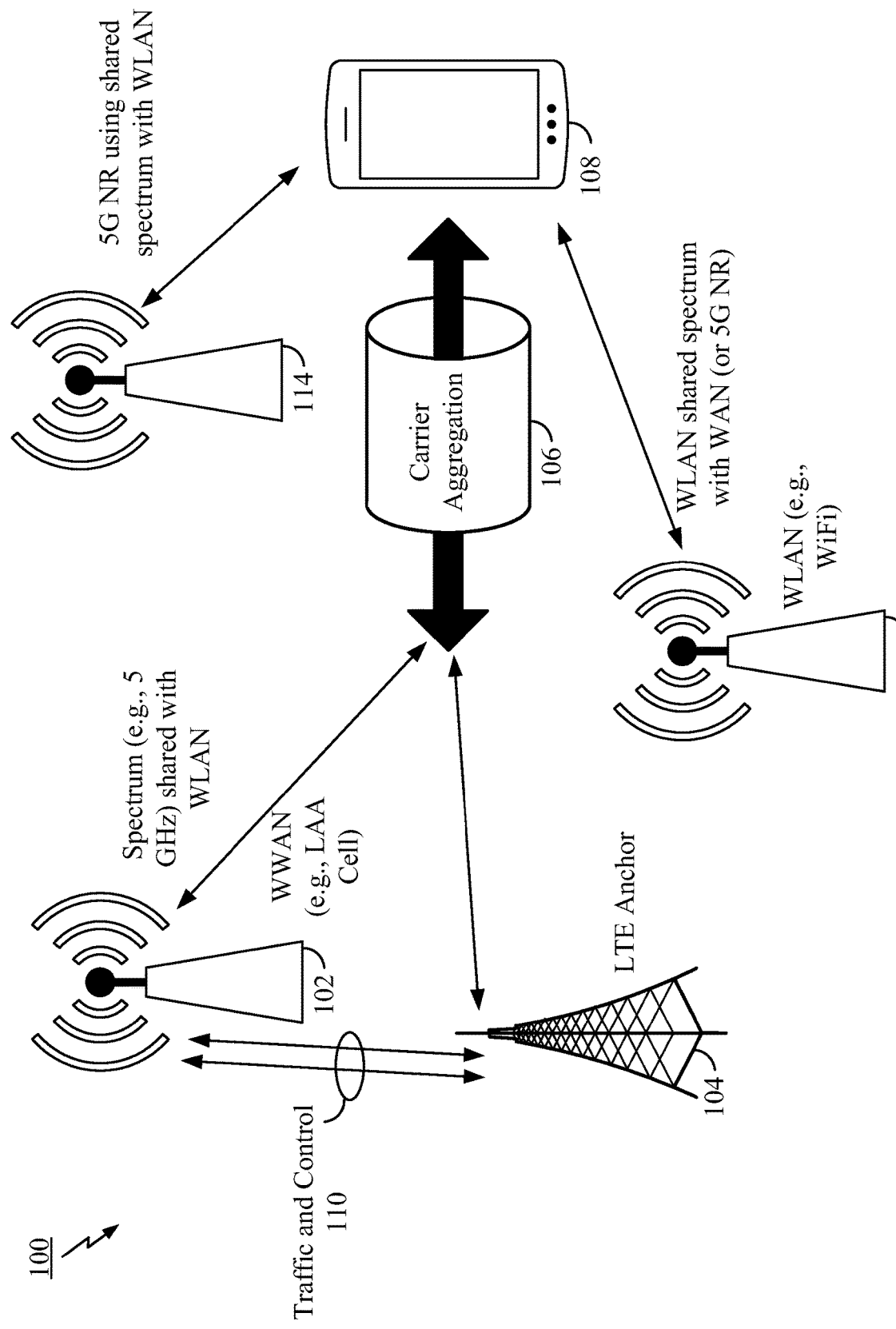
FIG. 1 is a diagram illustrating an exemplary wireless environment in which embodiments of the present invention may be practiced.

Aspects of the invention are disclosed in the following description and related drawings directed to specific embodiments of the invention. Alternate embodiments may be devised without departing from the scope of the invention. Additionally, well known elements of the invention may not be described in detail or may be omitted so as not to obscure the relevant details of the invention.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises", "comprising", "includes" and/or "including", when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device (e.g., a server or device). It will be recognized that various actions described herein can be performed by specific circuits (e.g., application specific integrated circuits), by program instructions being executed by one or more processors, or by a combination of both. Additionally, these sequences of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

The present disclosure discusses methods and apparatus for controlling radios in a wireless device that provide protection for the components of radios using concurrent RF bands. In a particular aspect, the disclosed method and apparatus allow a WLAN and a WWAN operating in the same or close RF spectrum to be effectively concurrent while preventing any damage in their receive chains that may occur when the WLAN goes to transmit or the WWAN goes to transmit. This protection is accomplished, in one example, with logic circuitry that serves to disable at least one of the WLAN transmit circuitry (e.g., a WiFi WLAN Power Amplifier PA) or WLAN receive circuitry (e.g., a WiFi WLAN low noise amplifier LNA) or the WWAN transmit circuitry (e.g., an eLAA Power Amplifier PA) or the WWAN receiver circuitry (e.g., an LAA's LNAs) situations potentially causing damage may be present or determined. Logic circuitry is utilized because the concurrency between 5 GHz WiFi and eLAA, for example, requires a fast, reliable mechanism to quickly protect the radios, particularly since the technologies are Time Division Duplexed (TDD). A processor and software is not fast enough to deal with the short time frame or low latency at which the WiFi and LAA radios are turned on (typically in the order of a few microseconds). For example, there is no known simple RF front-end (RFFE)/software coexistence mechanism due to the low latency timeline to practically protect the LNAs in either the WiFi or LAA radios. It is also noted similar issues arise between 5G NR systems and WLAN systems sharing spectrum, and the concepts herein are applicable to such configurations as well.

Advantages of the presently disclosed methods and apparatus include low cost and greater cost effectiveness over designing an LNA to provide excessive dynamic range, which adds to the insertion loss, noise figure degradation, and the cost of the LNA. Other advantages include eliminating the need to oversize the electrostatic discharge (ESD) diodes to absorb stronger jammers, and avoiding costly filtering to allow only limited subband concurrency between LAA and WLAN. Yet another advantage of the disclosed methods and apparatus is the ability to tolerate poor antenna separation that may arise from either the configuration or placement of concurrent radio systems and antenna within a wireless device, or the utilization of antenna switch diversity (AsDiv), which may further exacerbate antenna isolation. This advantage may be significant where form factor reductions are important and guaranteeing good antenna isolation (e.g., ≥20 dB antenna separation) is not necessarily always practical.

The various concepts presented throughout this disclosure may be implemented across a broad variety of telecommunication systems, network architectures, and communication standards. FIG. 1, as an illustrative example without limitation, illustrates an exemplary radio access network 100 in which the present methods and apparatus may be implemented. The network 100 includes a WWAN base station, such as an LAA base station, access point (AP), or node 102 that transmits or receives on a shared spectrum, such as the 5 GHz band shared with other technologies such as WiFi 5 GHz. While base station 102 is illustrated as an LAA base station in FIG. 1, it is noted that the disclosure is not necessarily limited to such, but may include other technologies that are operable concurrent with another technology using a shared spectrum for transmit and receive.

Additionally, network 100 includes a WWAN base station, such as an LTE base station or eNode B 104 that provides an anchor frequency or bandwidth (e.g., from 400 MHz to 3.8 GHz) with which the transmissions to and from the LAA cell 102 are aggregated as shown with carrier aggregation 106. These combined carriers are used for communication with a wireless device 108, such as a mobile station or User Equipment (UE). As mentioned earlier, for LAA systems, the wireless device 108 may both receive and transmit using an LAA radio within device 108 using the shared spectrum. Of further note, the base station 102 may communicate via both traffic and control channels with base station 104 as illustrated by channels 110.

Network 100 further includes a WLAN access point (AP) 112 that utilizes the shared spectrum utilized by base station 102. In the example of FIG. 1, the AP 112 is a WiFi AP or node using the 5 GHz spectrum, but is not limited to such. In various implementations, the air interface in the radio access network 100 may utilize various combinations of licensed spectrum, unlicensed spectrum, or shared spectrum. Yet further, in an aspect network 100 may include a 5G New Radio (NR) base station or gNB 114 that communicates with the wireless device 108 using a spectrum shared with WLAN base station 112.

In general, it is noted for purposes of this application that a base station (BS) serves a cell. Broadly, a base station is a network element in a radio access network responsible for radio transmission and reception in one or more cells to or from a wireless device or User Equipment (UE), such as UE 108. A BS may also be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), or some other suitable terminology.

The radio access network 100 is illustrated supporting wireless communication for a wireless device or UE 108. In the present application, the terms wireless device or UE may be referred to as a mobile apparatus, a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles (e.g., eLAA/C-V2X in Bands 46/47), aircraft, ships, and weaponry, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Further, the air interface in the radio access network 100 may utilize one or more duplexing algorithms. Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot.

The device 108 may also include one or more wireless local area network (WLAN) and wireless wide area network (WWAN) transceiver(s) that may be connected to one or more antennas. The wide area network transceiver(s) comprises suitable devices, hardware, and/or software for communicating with and/or detecting signals to/from other wireless devices within a network. In one aspect, the wide area network transceiver may be operable under 5G New Radio (NR), LTE, LTE Advanced, LTE-U, LAA, eLAA, Multe-Fire™, WCDMA, UMTS, 4G, or GSM, as examples. Additionally, any other type of wireless networking technologies may be used, for example, WiMax (802.16), Ultra-wideband, ZigBee, wireless USB, etc. The mobile device may communicate wirelessly with a plurality of wireless APs using RF signals (e.g., 2.4 GHz, 3.6 GHz, and 4.9/5.0 GHz bands) and standardized protocols for the modulation of the RF signals and the exchanging of information packets. Additionally, the WLAN transceiver(s) may be operable under any of a number of wireless technologies including WiFi (e.g., various specifications under IEEE 802.11) and Bluetooth.

Figure 2:
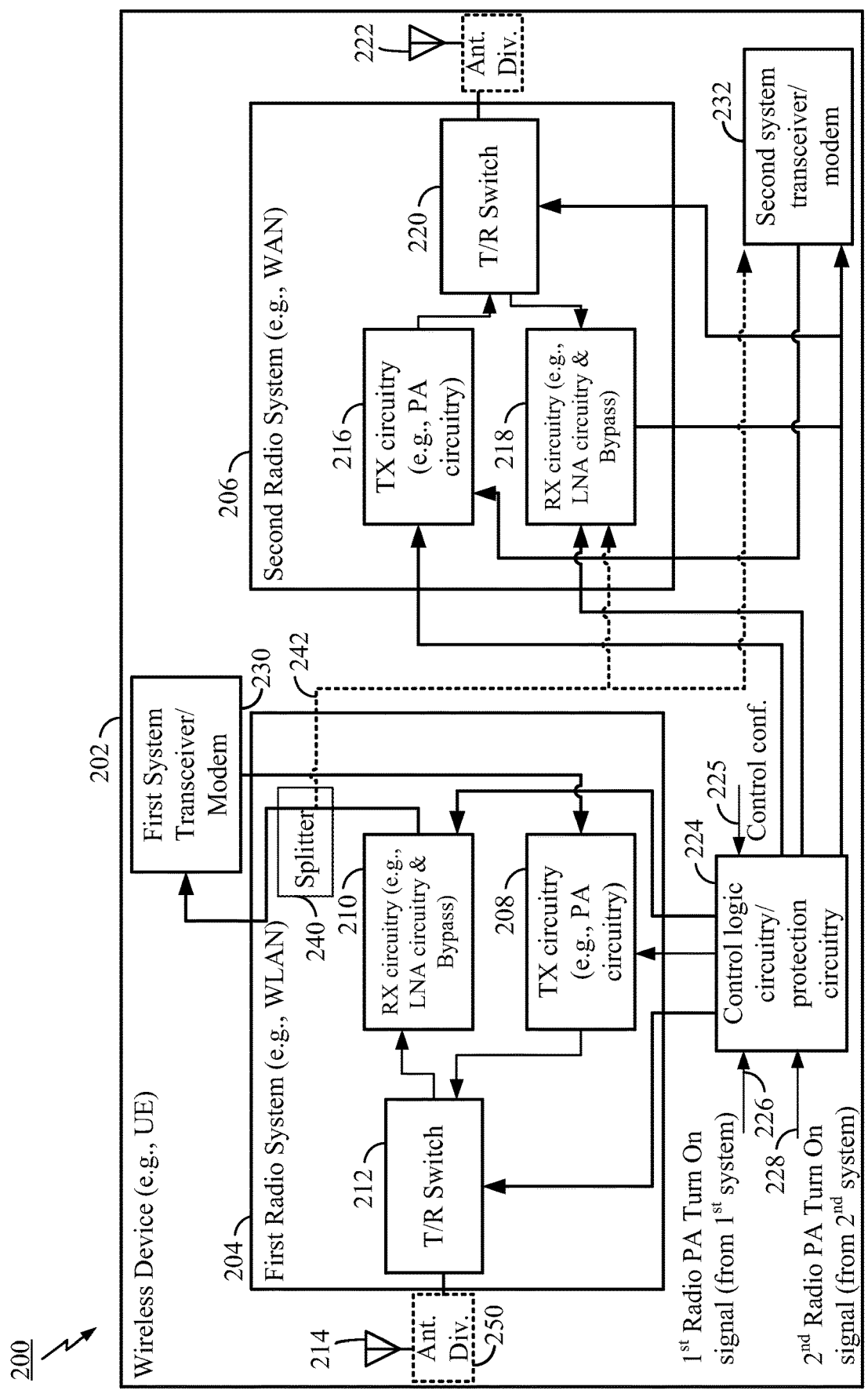
FIG. 2 illustrates an exemplary apparatus that may be employed in a wireless device for protection of components in coexistent radio systems.

FIG. 2 illustrates an exemplary apparatus 200 that may be employed in a wireless device, such as device 108 in FIG. 1, for protection of at least the receive components in concurrent radio systems. Apparatus 200 includes a wireless device 202 including at least a first radio 204 and a second radio 206. In an aspect each radio 204 or 206 may comprise a chipset, wireless modem, system on a chip (SoC), or a similar configuration. In an example, first radio system 204 may be a WLAN system operable in an RF spectrum shared by the second radio system 206, which may be a WWAN system. In another example, first radio system 204 may be a WiFi system and second radio system 206 may be an LAA system both operable in the 5 GHz band. In yet a further example, first radio system 204 may be a WiFi system or an LTE system and second radio system 206 may be a 5G NR system that operates in sub-6 GHz bands, for example, or a band whose RF transmissions could be deleterious to receive paths in the other radio system.

The first radio system 204 includes at least one transmit circuitry 208, such as power amplifier (PA) circuitry, for transmitting signals, at least receiver circuitry 210, such as low noise amplifier (LNA) circuitry for receiving signals, which may also include LNA bypass circuitry to selectively bypass the LNA or reduce the gain, and a Transmit/Receive (T/R) Switch 212 that switches between the PA circuitry 208 and the LNA circuitry 210 to selectively couple circuits 208 and 210 to at least one or more antennas 214 for either transmit or receive of signals by first radio system 204

Similar to the first radio system 204, second radio system 206 includes at least one transmit circuitry 216, such as power amplifier (PA) circuitry for transmitting signals, at least one receiver circuitry 218, such as low noise amplifier (LNA) circuitry for receiving signals, which may also include LNA bypass circuitry to selectively bypass the LNA (or short the input to ground or bypass reduce the gain in other examples), and a Transmit/Receive Switch 220 that switches between the PA circuitry 216 and the LNA circuitry 218 to selectively couple circuits 216 and 218 to at least one or more antennas 222 for either transmit or receive of signals by second radio system 206.

The device 202 further includes a control logic 224, which may comprise a number of logic gates, such as AND and OR gates in an example. The logic 224 is configured to receive or be triggered by internal signals from the first radio system 204 or the second radio system 206 to engender various switching, modifying, blanking, or disabling of the transmit circuitry 208 (PA circuitry), transmit circuitry 216 (PA circuitry), receiver circuitry 210 (LNA circuitry), receiver circuitry 218 (LNA circuitry), T/R switch 212, or T/R switch 220 communicatively coupled thereto and the operations of which will be described in more detail later. The signals input to the control logic 224 may include a first radio PA ON signal 226 and a second radio PA ON signal 228, which may be issued by transceiver or modems for the systems, such a first modem 230 and second modem 232.

In operation, the system 200 and control logic 224, in particular, provide the ability to quickly turn off, blank, or disable a PA transmit circuit of one radio system in order to protect the LNA of the other radio system if that other system has its LNA connected to the antenna through its T/R switch or avoid interference if the other radio system begins to transmit. In another aspect, control logic 224 also provides the ability to quickly disable or modify the LNA receive circuitry of one radio system after the other radio system PA is turned on in order to protect the LNA receive circuitry It is noted that although control logic 224 is shown apart or separate from the first radio system 204 or the second radio system 206, in certain aspects portions of the control logic 224 may reside within one or both of the first radio system 204 or the second radio system 206. It is also noted here that for the specific examples illustrated later herein in FIGS. 3 and 5-8, the control logic circuits therein may also be located or fully integrated within one radio system, be distributed or integrated among two or more radio systems, be partially residing external to one or more of the radio systems with other portions within one or more of the radio systems, or be entirely external to the radio systems within the wireless device.

In other examples, an external processor, microprocessor, system on a chip (SOC), one or more mobile station modems (MSM), or similar devices may serve to control and variably configure the control logic circuitry 224, as illustrated by control input 225 in FIG. 2. In aspects, the control logic circuitry 224 may be reconfigurable, such as with Field Programmable Gate Arrays (FPGAs), wherein an external processor, microprocessor, system on a chip (SOC), mobile station modems (MSMs), or similar device(s) may programmably reconfigure the control logic circuitry/protection circuitry 224 based on the particular types or operations of the various radio systems In still another example, the control circuitry 224 may be distributed among multiple MSMs, baseband processors, and/or front end modules. It is also noted that the control logic circuitry 224 may be configurable such that one radio system may be the priority system (e.g., the master radio system) over the other radio system (e.g., the slave radio system), wherein transmit of one radio system will take precedence or have priority over the other radio system. For example, the control logic circuitry 224 could be configured such that whenever a turn on signal 228 from the second radio system radio system is detected or received, the transmit circuitry 216 is allowed to turn on, and either the transmit circuit 208 is turned off or the RX circuity 210 is modified or disabled, or both. Alternatively, the control logic 224 could be configured/reconfigured to give priority of transmission to the first radio system whenever turn on signal 226 is detected.

Of note here, the present methods and apparatus may further utilize the variously disclosed T/R switches, such as 211 and 220 (as well as those T/R switches shown in the various examples of FIGS. 3 and 5-8 herein), to disable the path to either the LNAs or PAs under the control or signaling of the control logic circuitry/protection circuitry as yet another means for disabling the LNA or PA circuitry. Yet further, it is noted that the T/R switches connects either an LNA or PA to an antenna (e.g., antennas 214, 222), but it is also to be understood that the chain between the T/R switches and the antennas may also include various components such as antenna switch diversity (e.g., an AsDiv switch) as well as a band pass filtering (BPF). These additional components are illustrated herein with optional component 250 labeled "Ant. Div." for antenna diversity, but to be understood as including other components such as BPF and other antenna switching/control. It should be also understood that the illustration of the "AntDiv" block shown in the various additional figures herein is intended to convey one or more of the same components.

In another example, the output of the LNA circuitry 210 is output to further first transceiver or modem circuitry or circuitries 230 pertaining to first radio system front end 204, including further LNAs and further processing circuitry (e.g., DSPs, etc.). Additionally, circuitry 230 may provide input transmission data to the PA circuitry 208 for transmission. Similarly, the output of the LNA circuitry 218 is output to a further transceiver or modem circuitry 232 pertaining to second radio system front end 206, including further LNAs and further processing circuitry (e.g., DSPs, etc.). Additionally, second system modem circuitry 232 may provide input transmission data to the PA circuitry 216 for transmission by the second radio system.

According to yet another aspect, the output of the LNA circuitry 210 in the first radio system 204, as merely an example, may be output through a splitter 240 or similar device whereby the output of LNA circuitry 210 is split and sent to transceiver 230, as well as the LNA circuitry 218 or transceiver 232 in the second radio system as shown by dashed lines 242. This may be useful where one or more front end streams, paths, or channels are used in the first radio system 204 and also operate independently such that received signals are repurposed for another technology, such as the technology of the second radio system.

Figure 3:
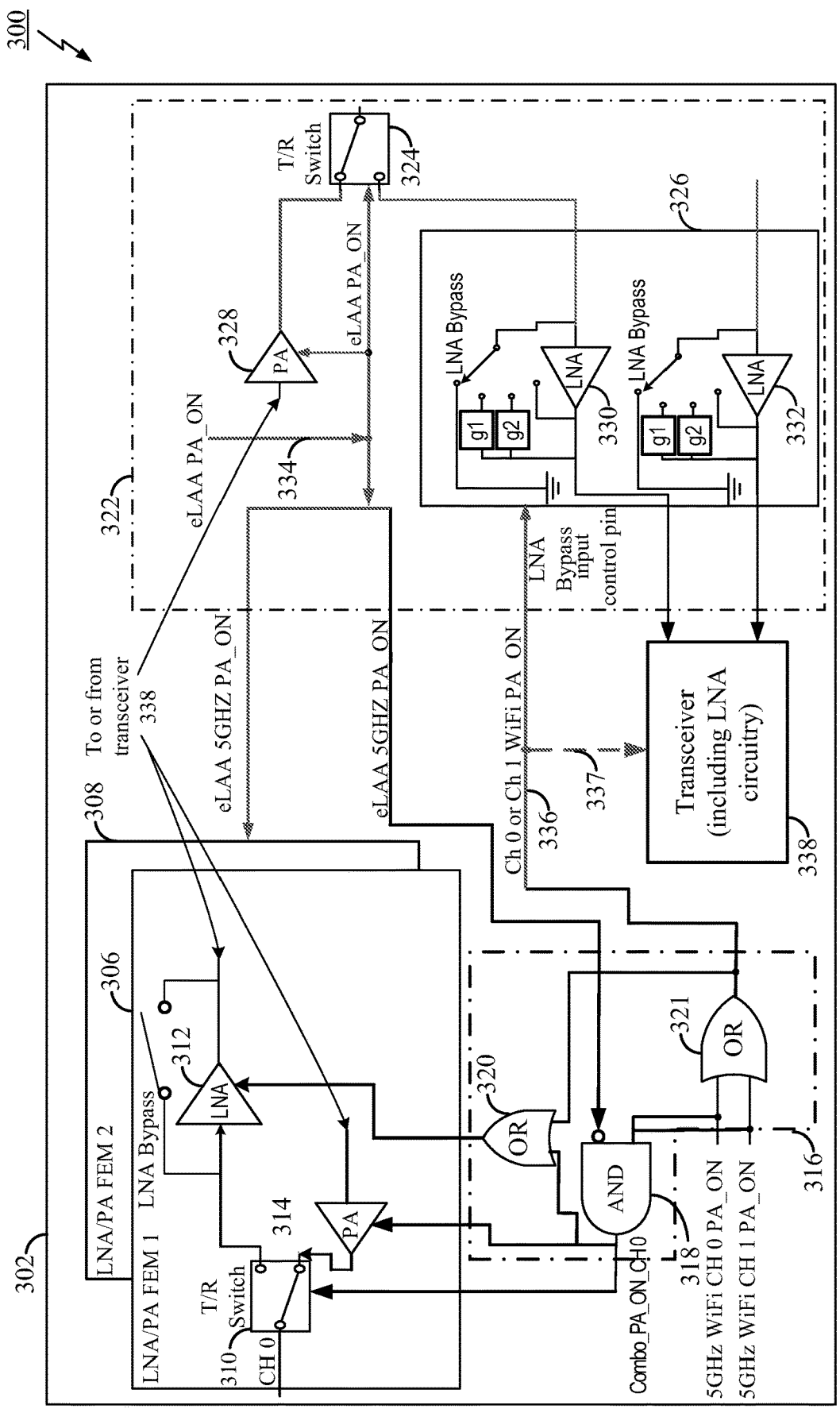
FIG. 3 illustrates an exemplary block diagram of an implementation of the apparatus in FIG. 2.

FIG. 3 illustrates an exemplary block diagram of a particular implementation 300 of the apparatus in FIG. 2. As illustrated, a wireless device 302 includes a WiFi system 304 including at least two transmit/receive portions 306, 308 (e.g., Front-end Modules (FEMs)), each providing a respective WiFi channel (i.e., channels CH0 and CH1). Although only illustrated for one transmit/receive portion, each transmit/receive portion 306, 308 includes a T/R switch 310 that is selectively coupled with a receive LNA 312 and a power amplifier PA 314. The T/R switch 310 connects either the LNA 312 or the PA 314 to an antenna (not shown) and the chain between the T/R switch 310 and the antenna may also include antenna switch diversity (e.g., an AsDiv switch) as well as a band pass filter (BPF). It is noted here that when using antenna switch diversity, antenna separation (e.g., a particular level of antenna separation such as greater than 20 dB antenna separation) becomes even more challenging. Accordingly, a further benefit of the present apparatus and methods when using antenna separation such as an AsDiv (or "Ant. Div." or "AD") switch is increased protection against damage to LNAs that results when the antenna separation might be exacerbated by the use of antenna switch diversity.

Included in communication with each transmit/receive portion 306, 308 are gates comprising part of a control logic 316. In particular an AND gate 318 and an OR gate 320 are respectively coupled with the PA 314 and the LNA 312. Additionally, the control logic 316 includes a second OR gate 321, which is configured to receive 5 GHz WiFi PA ON signals for channels CH 0 and CH 1 indicating that the PA (e.g., PA 314) in the portions 306 or 308 is being turned on. Similar to the control logic illustrated in FIG. 2, control logic 316 is part of a protection mechanism or scheme for protecting LNA 312 and avoiding interference with an LAA portion 322 of device 302, which will be discussed below.

The LAA portion 322 (e.g., a second radio system) includes a T/R switch 324 that is selectively coupled with at least one receive LNA bank 326 and a power amplifier PA 328. The LNA bank 326 includes an LNA 330 for receiving the signal from the T/R switch 324, and an LNA 332 that is configured for receiving a signal from another antenna different from an antenna connected to T/R switch 324. The T/R switch 324 connects either the LNA 330 or the PA 328 to an antenna (not shown) and the chain between the T/R switch 324 and the antenna may also include an AsDiv switch as well as a band pass filter (BPF). A control signal 334, which is labeled "eLAA PA_ON" in the example of FIG. 3, is generated from within the eLAA transceiver and is asserted for turning on the PA 328. This signal 334 is also sent to the logic circuitry 316, which is labeled as eLAA 5 GHZ PA_ON. In particular, eLAA 5 GHZ PA_ON is input to the logic negation input of AND gate 318 such that the output of AND gate 318 will be asserted high when the eLAA 5 GHz PA is off or low and the 5 GHz WiFi signal at the input of OR gate 321 is on or high, or, alternatively the eLAA 5 GHz PA signal is on or high and the 5 GHz WiFi signal at the input of OR gate 321 is off or low.

Of further note, the output signal 336 of OR gate 321 (labeled as Ch 0 or Ch 1 WiFi PA_ON) will be asserted high when at least one of either the Channel 0 or the Channel 1 WiFi PA is on (e.g., 5 GHz WiFi PA_ON is asserted high). Signal 336 is input to an LNA input bypass control pin (or similar input) in the LNA bank 326, which causes at least one LNA (e.g., LNA 330) to bypass by shorting to ground as illustrated. In another aspect, the bypass control may cause modification of the LNA circuitry by attenuating the LNA gain through a plurality of selectable reduced gains for the LNA, thereby providing protection for the LNA in this manner as well. As an example, the various selectable gains is illustrated through a number of blocks (labeled "g1", "g2", etc. in the figures) that are switchable or couplable between the input and outputs of the LNAs 330 and 332, as merely one example of how to select reduced or attenuated gain for an LNA. These blocks may consist of resistors or networks of various passive components, or even active components that effectuate selection or attenuation of the gain of the LNA. Still further, it may be envisioned that output signal 336 may be utilized to not only bypass the front end LNAs shown in LNA bank 326, but also to control LNAs deeper in the LAA transceiver as well, which is illustrated by input 337 of signal 336 to a transceiver block 338. It is noted that even if signal 336 does not control LNAs within transceiver circuitry 338, the protection afforded by the modification of the gain or shorting of LNAs in bank 326 provides a measure of protection for the LNAs in transceiver 338.

Of still further note, the LNA bank 326 may be configured such that the any number of LNAs may be used in the bank, such as when greater numbers of antennas are connected to the LNA bank 326. Additionally, the protection selected for each LNA may be different, such as LNA 330 is shorted to ground and LNA 332 is switched to a reduced gain, as an example.

In another aspect, in some situations the LNAs may be placed in bypass for various power saving modes. The present methods and apparatus may nonetheless be configured such that the protection mechanism will be operable to protect the radio LNAs regardless of the gain modes of the LNAs, even for power saving modes. In one example, the present methods and apparatus may disable an LNA and route a high power signal through the LNA bypass switches to ground, instead of to the LNA output. This disabling also serves to reduce the voltage swing at LNA input and maximizes the protection at the LNA input. Of further note here, the larger the ground bypass switch size, the protection is better suited to handle higher power signals. In the example of bypassing the input of the LNA to ground, such switching also protects the further stages of the transceiver (e.g., transceiver 338) and the LNAs within the further stages. The protection mechanism disclosed herein also does not introduce a current or LNA noise figure penalty, and the area cost is very small as well.

For the particular example of FIG. 3, the logic circuitry 316 is configured to give precedence or priority to the LAA transmitter (and signal eLAA PA_ON) as a master transmitter in this case. Thus, the WiFi transmit by each PA 314 in each front end module (e.g., portions 306, 308) is disabled by eLAA PA_ON signal. Additionally in another aspect, the LNAs 312 are also disabled (e.g., via OR gate 320). In a further aspect, the LAA portion 322 may be configured to send a software coexistence message to inform the WLAN system that the LAA transmit is active. In yet another alternative aspect, the software coexistence message may be used by the WLAN system to ensure that the WLAN receiver path is modified or disabled (e.g., the LNAs are gain attenuated or bypassed).

Figure 4:
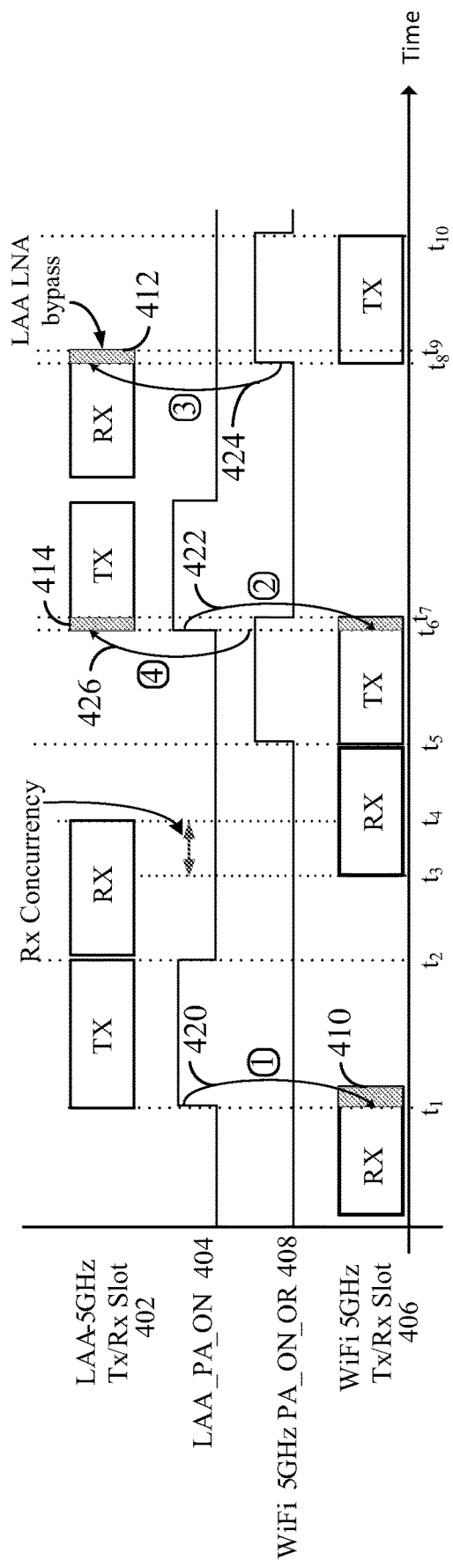
FIG. 4 illustrates an exemplary signal timeline for various signals in the apparatus of FIG. 3.

FIG. 4 illustrates a signal timeline for various signals in the apparatus 300 of FIG. 3 to better understand the operation of this apparatus. The top timeline 402 illustrates the transmit and receive operations of LAA transceiver or radio system. As will be appreciated by those skilled in the art, LAA is a Time Division Duplex system so the eLAA transceiver transmits signals at a first time separate from a second time for receiving signals as may be seen in timeline 402.

Corresponding to the transmit times shown in timeline 402, the eLAA PA ON signal timeline 404 (e.g., signal 334 in FIG. 3) shows that while this signal is asserted high, the eLAA PA is turned on and the eLAA transceiver transmits signals. Otherwise, the LAA transceiver may receive signals via the LNA receiver.

The WiFi transmit and receive, which is also TDD, is shown at timeline 406, and a corresponding timeline 408 shows that the WiFi transceiver generally transmits when the output signal 336 of the OR gate 321 (i.e., WiFi 5 GHz PA_ON) is asserted high. As may be further seen in FIG. 4, the LAA and WiFi systems are illustrated as transmitting with particular antennas. It is noted here that the presently disclosed protection mechanism is typically applicable when the antennas used by the WiFi transceiver are different from the antennas used by the LAA transceiver, or when the number of antennas used in an antenna array are different between the two transceivers.

The timelines illustrated FIG. 4 also illustrate various use cases where the protection mechanism (e.g., the logic circuitry 316) provide protection for LNAs in either the WiFi or eLAA receivers, as well as avoid interference between the WiFi and eLAA transmitters.

In a first case (case 1 denoted with reference 420), it is noted that when the WiFi radio is presently receiving, which potentially leaves the WiFi LNA vulnerable to concurrent transmissions on the same frequency band such as a transmitted eLAA signal, if the eLAA PA ON signal goes high, the eLAA PA will begin to transmit as shown at time $t_1$. Upon the eLAA PA ON signal going high, however, the logic circuitry 316 of FIG. 3 will very quickly disable the WiFi receiver to prevent possible damage to the LNA (e.g., LNA 312) essentially at time $t_1$ as well. This is accomplished, in part, by the AND logic gate 318 going high, which in turn triggers logic OR gate 320 to bypass LNA 312. Accordingly, the WiFi receive is truncated as illustrated by shaded area 410 after time $t_1$.

According to a second case (case 2 denoted with reference 422), when the WiFi transmitter is transmitting from time $t_5$ and the eLAA PA_ON signal goes high and the eLAA starts to transmit during this time as shown at time $t_6$, eLAA PA_ON signal will also cause the WiFi transmit PA to become disabled. This is accomplished, in part, through the output of logic AND gate 318 going low, which disables PA 314 as illustrated in FIG. 3. In this manner, interference between the eLAA transmitter and the WiFi transmitter is avoided. Those skilled in the art will appreciate that for this particular example, the configured logic gives precedence or priority to the eLAA transmitter, which is the master transmitter in this case. This may be done because the eLAA radio does not recover as quickly as WiFi in general, and thus disruption of WiFi is favored over disruption or delay of the eLAA. This precedence is merely exemplary, however, and other systems and technologies employing the presently disclosed protection mechanism may be configured to favor another technology, or alternatively implement some contention system or methodology to determine which radio will be disabled.

In a third case (case 3 denoted with reference 424), when the eLAA receiver is enabled and the WiFi PA_ON_OR signal 408 output from OR gate 321 goes high to turn on the WiFi PA, this signal will trigger the LAA LNA (e.g., LNA 330) to gain bypass, or alternatively to reduce the LNA gain in order to protect the LAA receiver LNA from damage by the WiFi transmission. This causes attenuation or even cessation of the receive signal as indicated by shaded area 412 between time $t_8$ and $t_9$.

Figure 5:
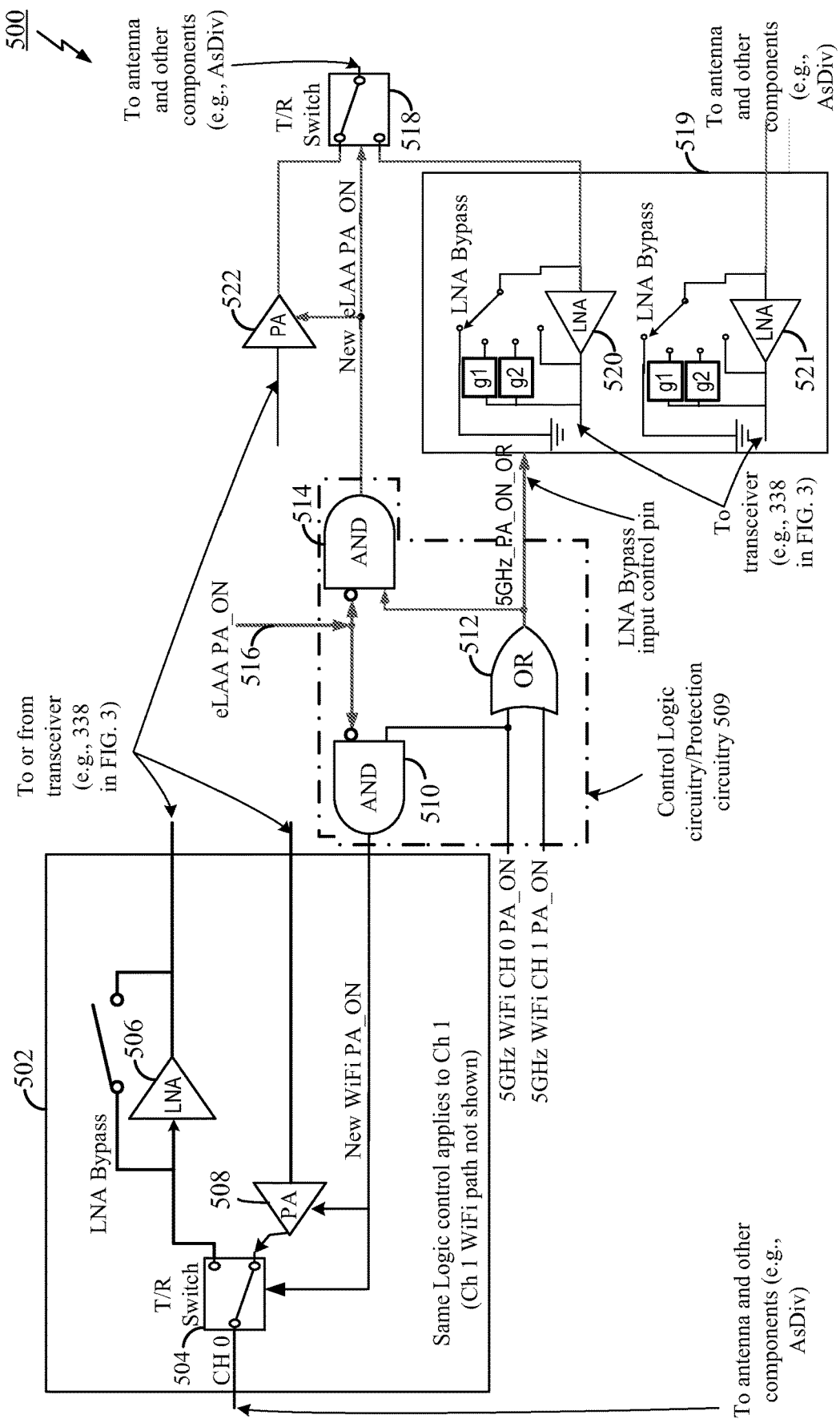
FIG. 5 illustrates an exemplary block diagram of another implementation of the apparatus in FIG. 2.

FIG. 5 illustrates another exemplary block diagram of another particular implementation of the wireless device apparatus illustrated in FIG. 2. As illustrated, a wireless device 500 includes a WLAN system 502, such as a WiFi system, that includes at least two transmit/receive portions, each providing a respective WiFi channels (i.e., channels CH 0 and CH 1), although only Channel CH 0 is shown in FIG. 5. The system 502 includes a T/R switch 504 that is selectively coupled with a receive LNA 506 and a power amplifier PA 508. The T/R switch 504 connects either the LNA 506 or the PA 508 to an antenna (not shown) and the chain between the T/R switch 504 and the antenna may also include an AsDiv switch as well as a band pass filter (BPF). The system 502 may include, externally as shown or internally, a number of control logic circuits or gates 510, 512, 514 that comprise part of a control logic circuitry 509 for protecting the receive circuits of the WLAN (as well as an eLAA) or for avoiding interference between radios sharing a frequency spectrum or having close or overlapping frequency bands.

In particular, a first AND gate 510, an OR gate 512, and a second AND gate 514 may comprise logic circuitry used to mitigate LNA damage and interference. As shown, the first AND gate 510 has a first input coupled to a WiFi CH 0 PA_ON signal that is asserted high when signaling that the PA 508 should turn on. A logic negation input of the first AND gate 510 is also coupled to a logic negation input of the second AND gate 514, to which also an eLAA PA_ON signal 516 is input. Similar to the control logic illustrated in FIG. 2, the control logic of gates 510, 512, and 514 is part of a protection mechanism or scheme for protecting LNA 506 and avoiding interference with the LAA portion of device 500, which will be discussed below.

The wireless device 500 also includes a WWAN radio, such as an LAA receiver in this example, but the example is not limited to such. The WWAN radio includes a T/R switch 518 that is selectively coupled with at least one receive LNA bank 519 and a power amplifier PA 522. The LNA bank 519 includes an LNA 520 for receiving the signal from the T/R switch 518, and an LNA 521 that is configured for receiving a signal from another antenna (not shown) different from an antenna connected to T/R switch 518. The T/R switch 518 connects either the LNA 520 or the PA 522 to an antenna (not shown) and the chain between the T/R switch 518 and the antenna may also include an AsDiv switch as well as band pass filtering (BPF).

The control signal 516, which is labeled "eLAA PA_ON" in the example of FIG. 5, is generated from within the LAA transceiver and is asserted for turning on the PA 522, but is further controlled by AND gate 514. Thus, the output of AND gate 514 is designed "New_eLAA_PA_ON" as the AND gate 514 selectively applies the signal to PA 522, as well as T/R switch 518 based on the state of AND gate 514.

It is noted that for the AND gate 510, if the 5 GHz PA_ON signal input to OR gate 512 is low or zero, and the eLAA PA_ON signal 516 is also zero, then a New WiFi PA_ON signal output by the AND gate 510 will also be low or zero. In such case, both transmitters (i.e., WiFi and eLAA transmitters) will be off and receive by the LNAs is possible. If the eLAA_PA_ON signal 516 is high or one, and the 5 GHz PA_ON signal is low, the New WiFi PA_ON signal output by the AND gate 510 will again be low or zero. In the case where the 5 GHz PA_ON signal is high or one, and the eLAA PA_ON signal is low or zero, the New WiFi PA_ON signal will then be high or one, and the 5 GHz PA 508 will be active, and the receivers (506 and 520) will be off. Finally concerning AND gate 510, if both the eLAA PA_ON signal 516 and the 5 GHz PA_ON are high or one, the New WiFi PA_ON signal output by the AND gate 510 will again be low or zero. In this case both transmitters may be on and the WiFi 5 GHZ PA will then be disabled.

It is noted for the AND gate 514, if the 5 GHz PA_ON signal to OR gate 512 is low or zero, and the eLAA PA_ON signal 516 is also zero, then the New eLAA PA_ON signal output by the AND gate 514 will also be low or zero. In such case, both transmitters (i.e., WiFi and eLAA transmitters) will be off and receiving with the LNAs is possible. If the 5 GHz PA_ON signal is low or zero, but the eLAA_PA_ON signal 516 is high or one, the New eLAA PA_ON signal output by the AND gate 514 will be high or one. In this case, the eLAA PA (e.g., 522) will be on, and no receive will be enabled on the either radio system. In the case where the 5 GHz PA_ON signal is high or one, and the eLAA PA_ON signal is low or zero, the eLAA LNA 520 will be in bypass mode. Finally concerning AND gate 514, if both the eLAA PA_ON signal 516 and the 5 GHz PA_ON are high or one, the New WiFi PA_ON signal output by the AND gate 510 will again be low or zero. In this case both transmitters may be on and the eLAA PA will then be disabled.

In light of the example of FIG. 5, it is noted turning back to FIG. 4, according to fourth case (case 4 denoted with reference 426), while the WiFi transmitter, such as PA 508, is transmitting after time t5, and the WiFi PA_ON signal 408 from OR gate 512 is high or asserted, the subsequent change of the eLAA PA_ON signal from low to high at AND gate 514 will cause the New eLAA PA_ON signal to become low, which will cause the eLAA PA 522 to off in order to avoid interference. This disabling of the eLAA PA 522 is shown at the shaded time period 414 between time $t_6$ and $t_7$. Once the WiFi 5 GHz PA_ON_OR signal 408 goes low at time $t_7$, the eLAA PA 522 may then turn on for transmit.

Figure 6:
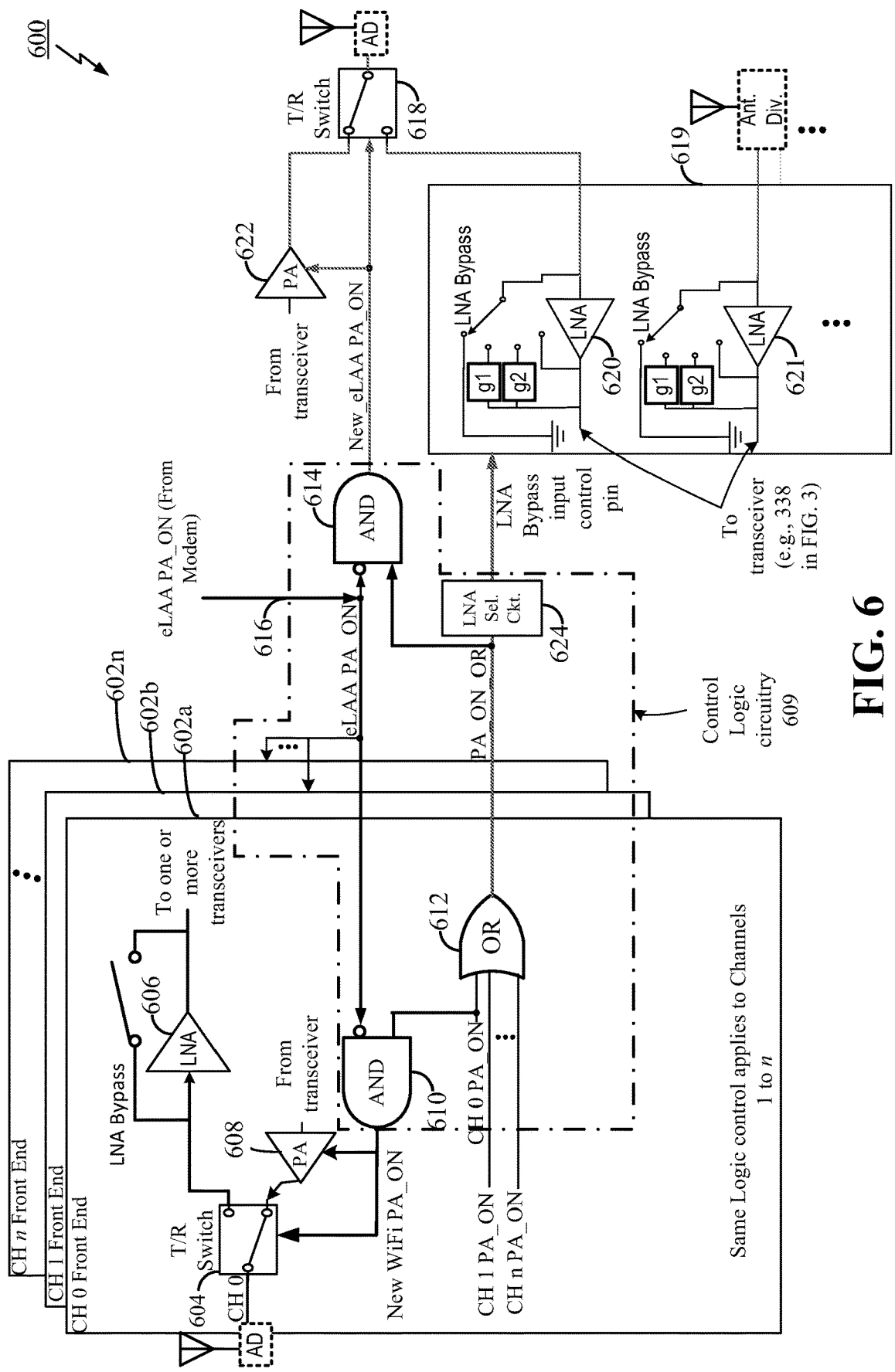
FIG. 6 illustrates an exemplary block diagram of still another implementation of the apparatus in FIG. 2.

FIG. 6 illustrates another exemplary circuit diagram of a particular implementation of the wireless device apparatus illustrated in FIG. 2. As illustrated, a wireless device 600 includes a WLAN system, such as a WiFi system, that includes an n number transmit/receive portions or modules 602a, 602b, . . . , 602n, each providing a respective channels (i.e., WiFi channels CH 0, CH 1, . . . CH n). Although only portion 602a for Channel CH 0 is shown in detail, the illustration is nonetheless to be taken as representative of each of portions 602. Each portion or module 602 includes a T/R switch 604 that is selectively coupled with a receive LNA 606 and a power amplifier PA 608. The T/R switch 604 connects either the LNA 606 or the PA 608 to an antenna and the chain between the T/R switch 604 and the antenna may also include an AsDiv switch as well as a band pass filter (BPF) (not shown). Among the systems 602a . . . 602n, these may include, internally as shown or externally, a control logic circuitry 609 that includes a number of logic gates that comprise part of a control logic for protecting the receive circuits of the WLAN (as well as a WWAN such as an LAA radio) or for avoiding interference between radios either sharing a frequency spectrum or using spectrum close in frequency such that interference and damage might occur in one radio system through transmission of the other radio system.

In particular, a first AND gate 610 (which is within each portion 602), an OR gate 612, which may be singular and used among the n number of portions 602, and a second AND gate 614 may comprise logic circuitry used to mitigate LNA damage and PA interference. As shown, the first AND gate 610 has a first input coupled to a WiFi CH 0 PA_ON signal that is asserted high when signaling that the PA 608 should turn on. A logic negation input of the first AND gate 610 is also coupled to a logic negation input of the second AND gate 614, to which also an eLAA PA_ON signal 616 is input. Similar to the control logic illustrated in FIG. 2, the control logic of gates 610, 612, and 614 is part of a protection mechanism or scheme for protecting LNA bank 619 (as well as LNA 606) and avoiding interference with the LAA portion of device 600.

The wireless device 600 also includes a WWAN radio, such as an LAA radio in this example, but the example is not limited to such. The WWAN radio includes a T/R switch 618 that is selectively coupled with at least one receive LNA bank 619 and a power amplifier PA 622. The LNA bank 619 includes an LNA 620 for receiving the signal from the T/R switch 618, and an LNA 621 that is configured for receiving a signal from another antenna different from an antenna connected to T/R switch 618. The T/R switch 618 connects either the LNA 620 or the PA 622 to an antenna (not shown) and the chain between the T/R switch 618 and the antenna may also include an AsDiv switch as well as band pass filtering (BPF).

While the LNA bank 619 is illustrated with two LNAs 620, 620 for the sake of example, it is noted that bank 619 may include more than two LNAs, any or all of which may be protected by the presently disclosed methods and apparatus. Of further note, the circuit 600 may be configured to provide for selective bypass or operation modification of a subset of LNAs in the LNA bank 619. As an example of such implementation, the circuit 600 may include LNA selection circuitry 624 that is configured to select various LNAs in the LNA bank 619 for various operation modifications. For example, the LNA selection circuitry 624 may direct on LNA to be shorted to ground (i.e., disabled), while another LNA is modified to have attenuated gain. Although the circuit 600 illustrates the LNA selection circuitry within the control logic circuitry 609, this is merely exemplary and this circuitry or logic may be implemented as a separate circuitry. The circuitry 624 may further receive input from other logic circuitry or software to enable selection of may include selection of the treatment of the various LNA dependent upon which particular radio access technology is being currently transmitted and/or received. For example, if portions 602 are transmitting according to WiFi and the LNA bank 619 is operable according to LAA radio technology, the circuitry 624 will select certain LNAs to be modified or disabled based on these particular technologies as appropriate. During another timeframe, if the portions are configured for transmitting and/or receiving according to 5G NR and the LNA bank is configured to transmit and/or receive LTE, then the circuitry 624 will select a different treatment of the LNAs in bank 619 as suitable or appropriate for these particular technologies. Furthermore, the selections made by circuitry 624 may also be based on particular operational parameters of the radio systems within wireless device 600.

Figure 7:
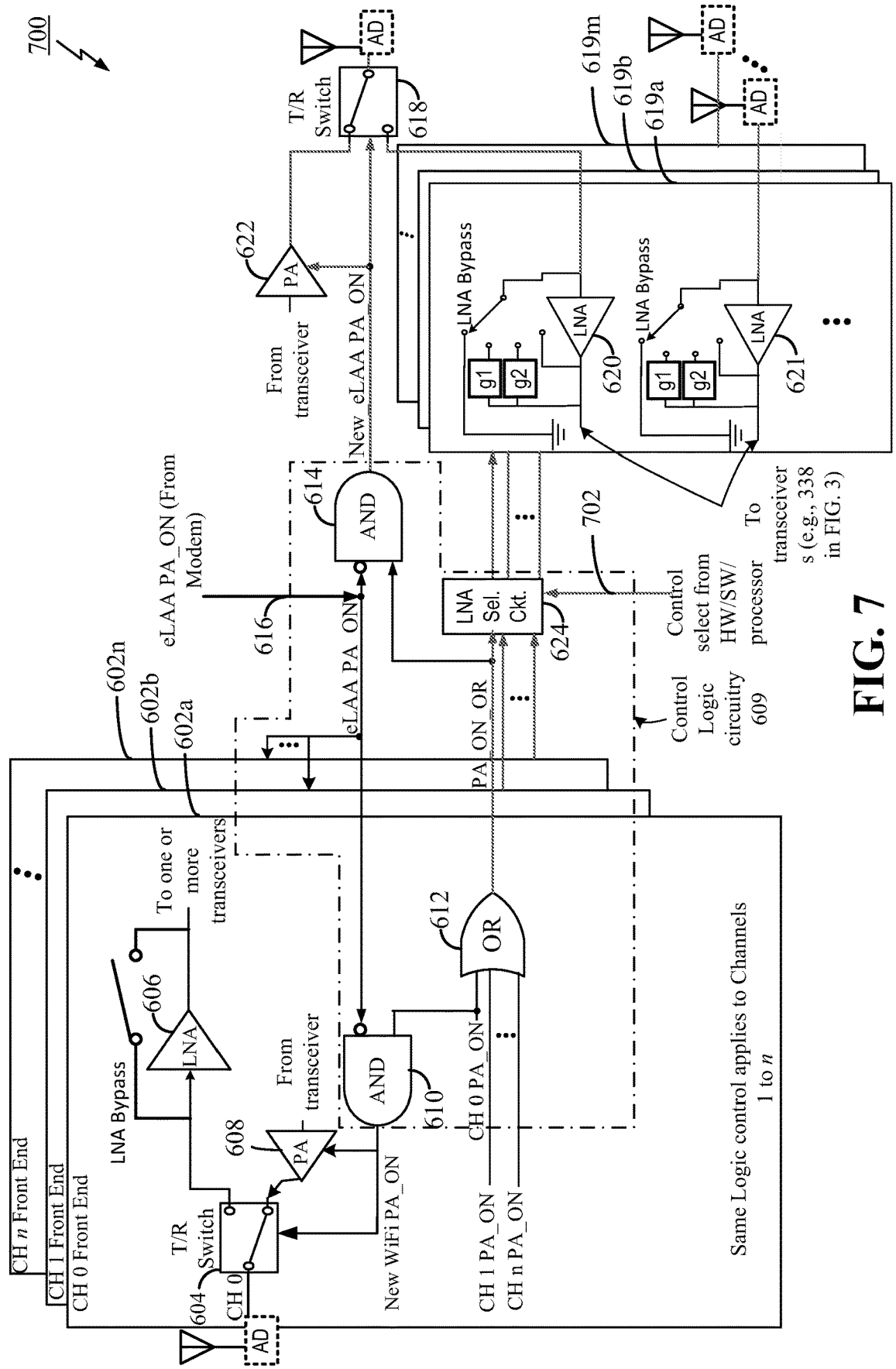
FIG. 7 illustrates an exemplary block diagram of still another implementation.

FIG. 7 illustrates another example 700 of an implementation of the circuitry of FIG. 3, wherein the LNA selection circuitry 624 is configured to control an "m" number of LNA banks 619a-619m, where same reference numbers denote that same components as illustrated in FIG. 6. For example, the LNA selection circuitry 624 may select various operations and disabling/gain attenuations for one or more of the LNA banks 619-619m. A control signal 702 may be generated by an external logic or hardware, processor, microprocessor, system on a chip (SOC), mobile station modem (MSM), or similar device, as well as from the various transceiver circuitry or other processors in the wireless device, or any combination of hardware and software based on the radio systems and operational characteristics.

Figure 8:
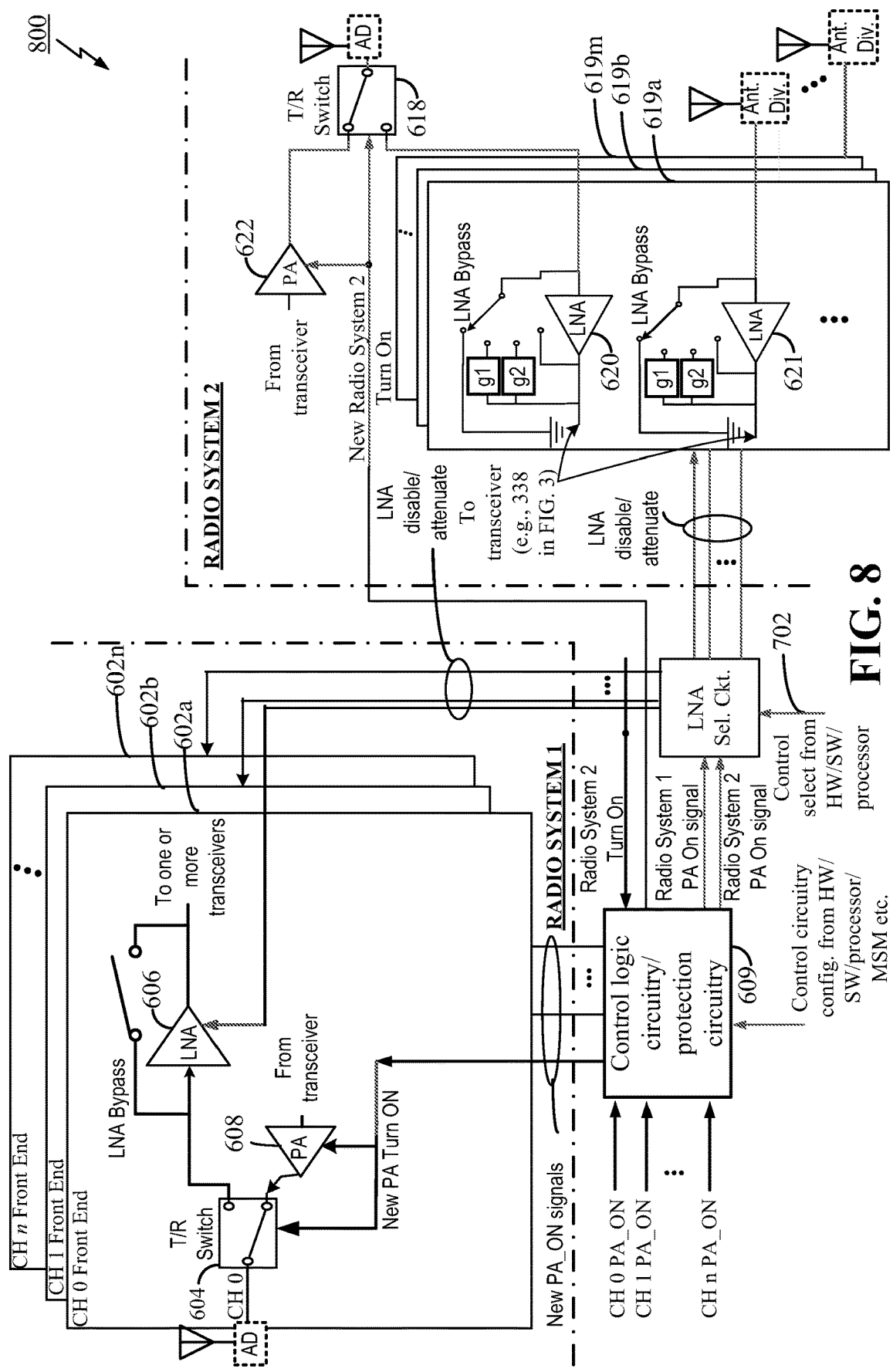
FIG. 8 illustrates an exemplary block diagram of yet another implementation.

FIG. 8 illustrates another example 800 wherein the control logic circuitry 609 is positioned or located external to the radio systems (e.g., Radio System 1 and Radio System 2 in the illustrated example). Additionally, the LNA selection circuitry 624 may be external to the radio systems and/or the control logic circuitry 609 and configured to select various LNA disable/attenuation for LNA banks 619a-619m in radio system 2, as well as LNA disable/attenuation for LNAs in radio system 1 for each of the various channels 602a-602n.

Figure 9:
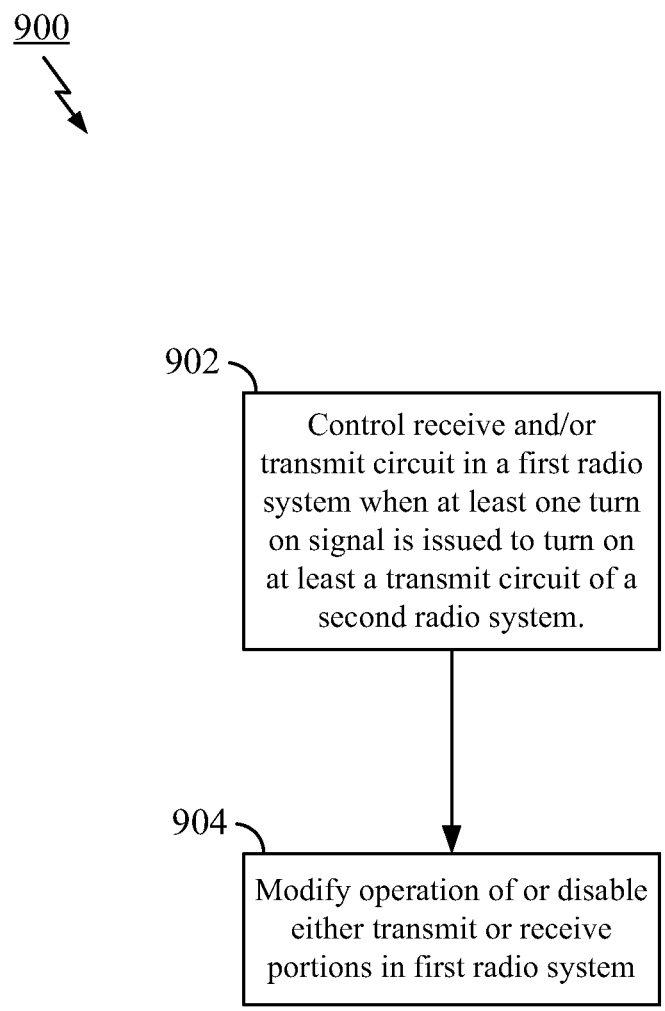
FIG. 9 illustrates a flow diagram of an exemplary method for controlling radio frequency concurrency in a wireless device.

FIG. 9 illustrates a flow diagram of an exemplary method 900 for controlling radio frequency concurrency in a wireless device, such as the devices illustrated in FIGS. 2, 3, and 5-8. The method 900 is a method for controlling concurrent and coexistent radio frequency (RF) first and second radio systems in a single wireless device. As illustrated, method 900 includes controlling either receiver and/or transmit circuitry in a first radio system when at least one turn on signal is issued to turn on at least a transmit circuitry of a second radio system as shown in block 902. That is, the method 900 may provide an active and set control of concurrent radios in a wireless device that is operable when a signal to turn on one radio (e.g., a second radio in this example) is issued, such as the various PA_ON signals discussed in connection with FIGS. 2, 3, and 5-8, such that the other radio circuit is controlled when this turn on signal is issued. The control of the other radio circuit includes modifying the operation of or disabling either the transmit or receive portions as illustrated in block 904.

According to a further aspect of method 900, the controlling of the at least one of the receiver circuitry or the transmit circuitry may include modifying the operation of at least one of the receiver circuitry or the transmit circuitry in the first radio system to at least one of protect the receiver circuitry or reduce interference from at least the transmit circuitry of the second radio system. As described herein, this modifying of the operation of the receiver circuitry in the first radio system may include disabling at least one low noise amplifier (LNA) in the first radio system by selectively bypassing the at least one LNA to protect the LNA from transmissions from at least one of the first radio system or the second radio system. Additionally, it is noted that selectively bypassing the at least one LNA includes coupling an input of the at least one LNA to ground.

In another aspect, modifying the operation of the receiver circuitry in the second radio system may include selectively reducing a gain of at least one low noise amplifier (LNA) in the first radio system. Selectively reducing the gain of the at least one LNA may yet further include selectively switching between a plurality of gains, such as by selecting a gain attenuation from a plurality of attenuations capable of being coupled between the input of the LNA and the output of the LNA, or at least to the input of the LNA.

Method 900 may further include modifying the operation of the transmit circuitry or the receiver circuitry by triggering modification of the operation of the transmit or the receiver circuitry with control logic circuitry configured to receive the at least one turn on signal issued to turn on the transmit circuitry of a radio system and then send or issue a control signal responsive to the received at least one turn on signal to the transmit or the receiver circuitry of one radio system to trigger modification of the operation of the transmit or the receiver circuitry in the other radio system.

Accordingly to a further aspect, method 900 may also include operation in a system, such as device 600 in FIG. 6, where one of the first or second radio systems includes a plurality of front end transmit/receive modules wherein each of the plurality of front end transmit/receive module is configured to be operable independent of the other front end transmit/receive modules in the plurality of module. Thus, when at least one of the front end transmit/receive modules of the plurality is operable for transmitting, operation of one or more of the remaining front end transmit/receive modules of the plurality may be controlled to provide protection from the transmitting front end transmit/receive module or reduction of interference with the transmitting front end transmit/receive module. Additionally, controlling the one of more of the remaining front end transmit/receive modules of the plurality of modules may include either disabling or modifying operation of one of transmit or receive circuits in the one of more of the remaining front end transmit/receive modules. In still another aspect, the method 900 may include controlling a receiver circuitry in one of the first or second radio systems including an LNA in a power saving gain bypass mode through modifying or disabling the operation of the LNA in the power saving gain bypass mode.

According to yet another aspect, method 900 may include controlling a receiver circuitry in one of the first or second radio systems where at least one of the first and second radio systems includes a plurality of low noise amplifiers (LNAs) and then selectively modifying the operation of one or more of the plurality of LNAs. The selective modification of the operation of one or more of the plurality of LNAs may include a combination of selectively reducing a gain of one or more of the plurality of LNAs and selectively changing a gain of one or more of the plurality of LNAs; i.e., some LNAs might be disabled, whereas others in the bank of LNAs are attenuated in gain. The selective modification in this manner may be determined based on one or more of operation parameters of the first or second radio system, and a technology of the first or second radio system. As an example, the LNA selection circuit 624 in FIG. 6 may be used to effectuate this methodology, but is not limited to such.

The method 900 may also include controlling at least one of a receive circuit or a transmit circuit in a radio system when at least one turn on signal is issued to turn on at least a transmit circuit of the other radio system is performed with a logic circuitry, wherein the logic circuitry is configured to issue a signal to disable an LNA in the receive circuit of one radio system when the other radio system issues a command to turn on a power amplifier (PA) in the transmit circuit as may be seen in the example of FIGS. 3 and 4.

It is noted that in the method 900, at least one of the radio systems is operable with a wireless Wide Area Network (WWAN) according to one of LTE-U technology, LTE, Licensed Assist Access (LAA) technology, enhanced LAA (eLAA) technology, or 5G New Radio (NR) technology. Additionally, another radio system is operable with a Wireless Local Area Network (WLAN) according to WiFi technology. Of further note, method 900 is applicable to two or more radio systems concurrently operable in a wireless device where the radio systems are asynchronous, and thus the provided logic circuitry or similar mechanism provides the benefit of protection of components even though the radios may not be synchronized or even aware of the transmit/receive of the other radio(s).

In yet further aspects, which were, in part, discussed in connection with FIG. 4, the method may include the logic circuitry is configured to issue a signal to disable an LNA in the receive circuit of the first radio system when the second radio system issues a command to turn on a power amplifier (PA) in the transmit circuit of the second radio system. In another aspect, the logic circuitry may be further configured to issue a signal to disable an LNA in the receive circuit of the second radio system when the first radio system issues a command to turn on a power amplifier (PA) in the transmit circuit of the first radio system. In still other aspects providing reduction of interference between first and second concurrent radio systems, the logic circuitry is configured to issue a signal to disable a power amplifier (PA) in the transmit circuit of the first radio system when the second radio system issues a command to turn on a power amplifier (PA) in the transmit circuit of the second radio system, or also to issue a signal to disable a power amplifier (PA) in the transmit circuit of the second radio system when the first radio system issues a command to turn on a power amplifier (PA) in the transmit circuit of the first radio system.

According to yet further aspects, the method 900 may include the logic circuitry configured to disable the transmit circuits in the first and second radio systems when both the first radio system and the second radio system have issue signals indicating that power amplifiers of the transmit circuits be turned off, as was discussed in connection with FIGS. 4 and 5, for example. Accordingly to still another aspect of the methodology disclosure herein, the logic circuitry may be configured to turn off receiver circuits in both the first and second radio systems when at least the transmit circuit of the first radio system is turned on.

The methodologies described herein may be implemented in different ways and with different configurations depending upon the particular application. For example, such methodologies may be implemented in hardware, firmware, and/or combinations thereof, along with software. In a hardware implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices units designed to perform the functions described herein, and/or combinations thereof. Of particular note, although particular logic configurations are shown FIGS. 2, 3, and 5-8, it should be appreciated by those skilled in the art that the logic control circuitry may be implemented using PLDs or FPGAs such that the logic (e.g., control logic 224) may be reconfigurable based on the particular radio technologies being used concurrently within the wireless device.

Figure 10:
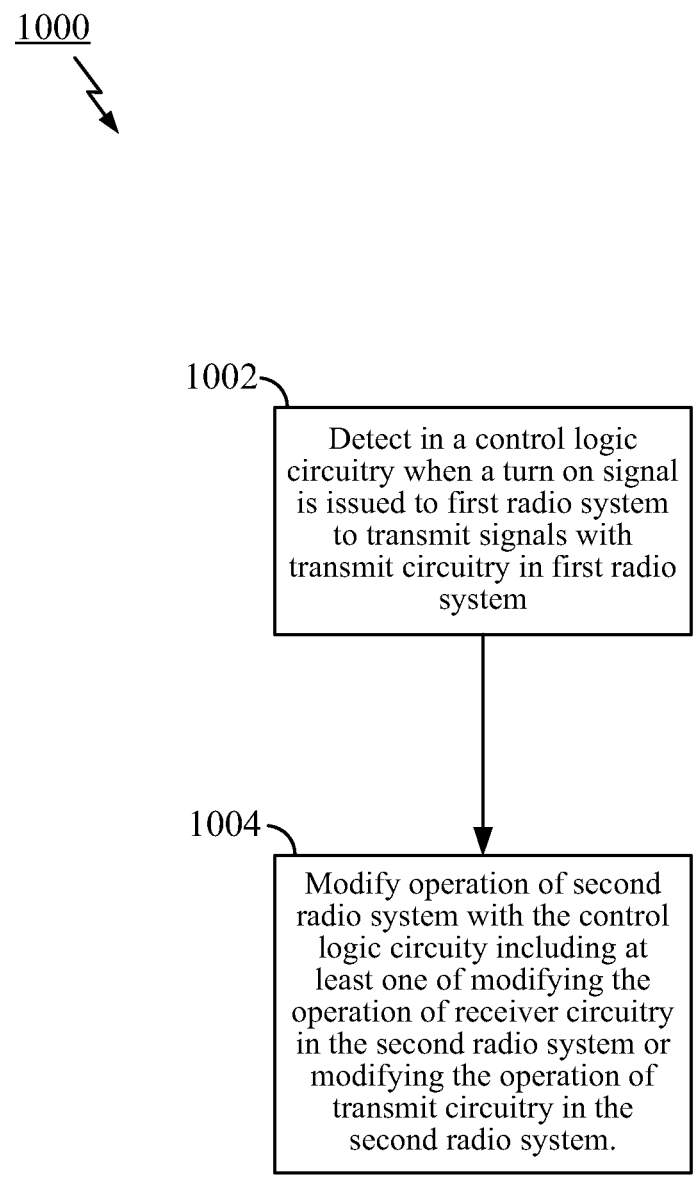
FIG. 10 illustrates a flow diagram of another exemplary method for controlling radio systems coexistence in a wireless device.

FIG. 10 illustrates a flow diagram of another exemplary method 1000 for controlling radio frequency concurrency in a wireless device, such as the devices illustrated in FIGS. 2, 3, and 5-8. As illustrated, method 1000 includes detecting in or with a control logic circuitry when a turn on signal is issued to a first radio system, such as issuance of a PA on (PA_ON) signal from a modem or transceiver as shown at block 1002. Next, method 1000 includes modifying, changing, or interrupting the operation of second radio system with the control logic circuity, where the modification includes at least one of modifying the operation of receiver circuitry in the second radio system or modifying the operation of transmit circuitry in the second radio system as shown at block 1004.

Figure 11:
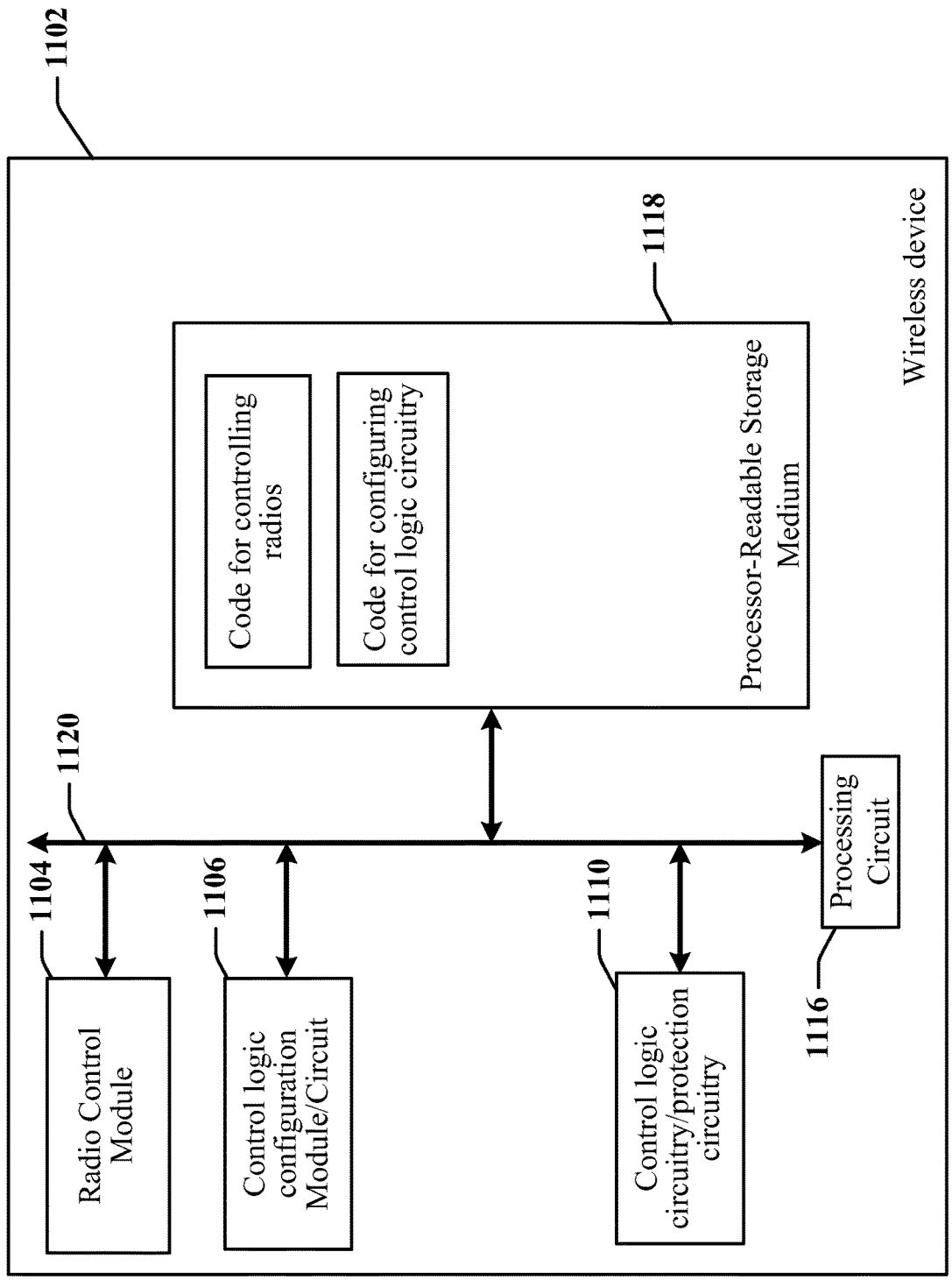
FIG. 11 a block diagram showing a simplified example of a hardware implementation for a wireless device or an apparatus within a wireless device that provides control of concurrent radio systems.

FIG. 11 illustrates a diagram showing a simplified example of a hardware implementation for a wireless device 1102 or an apparatus within a wireless device that provides control of concurrent radio systems. Device 1102 typically has a controller or processor 1116 that may include one or more microprocessors, microcontrollers, digital signal processors, sequencers and/or state machines. The device 1102 may be implemented with a bus architecture, represented generally by the bus 1120. The bus 1120 may include any number of interconnecting buses and bridges depending on the specific application of the processing circuit 1116 and the overall design constraints. The bus 1120 links together various circuits including one or more processors and/or hardware modules, represented by the modules or circuits 1104, 1106 and 1110, and the computer-readable storage medium 1118.

The processor 1116 is responsible for general processing, including the execution of software, code and/or instructions stored on the computer-readable storage medium 1118. The computer-readable storage medium may include a non-transitory storage medium. The software, when executed by the processor 1116, causes the device 1102 and the processing circuit 1116, in particular, to perform the various functions described supra for any particular apparatus. The computer-readable storage medium 1118 may be used for storing data that is manipulated by the processor 1116 when executing software.

The device 1102 further includes at least one of the modules 1104 and 1106. The modules 1104 and 1106 may be software modules running in the processor 1116, resident/stored in the computer-readable storage medium 1118, one or more hardware modules coupled to the processor 1116, or some combination thereof. The modules 1104 and 1106 may include microcontroller instructions, state machine configuration parameters, or some combination thereof. As illustrated, mode 1104 may be configured to effect radio control, such as controlling aspects of the logic disclosed herein, as well as the radio systems and interfacing and communication there between. Furthermore, the module 1106 may be configured for controlling and/or configuring the control logic circuitry 1110 operable according to the various different examples disclosed herein (See e.g., FIGS. 2, 3, 5-8). In another example, if the control logic circuitry 1110 utilizes FPGAs, module 1106 may be utilized to effectuate various logic configurations.

Figure 12:
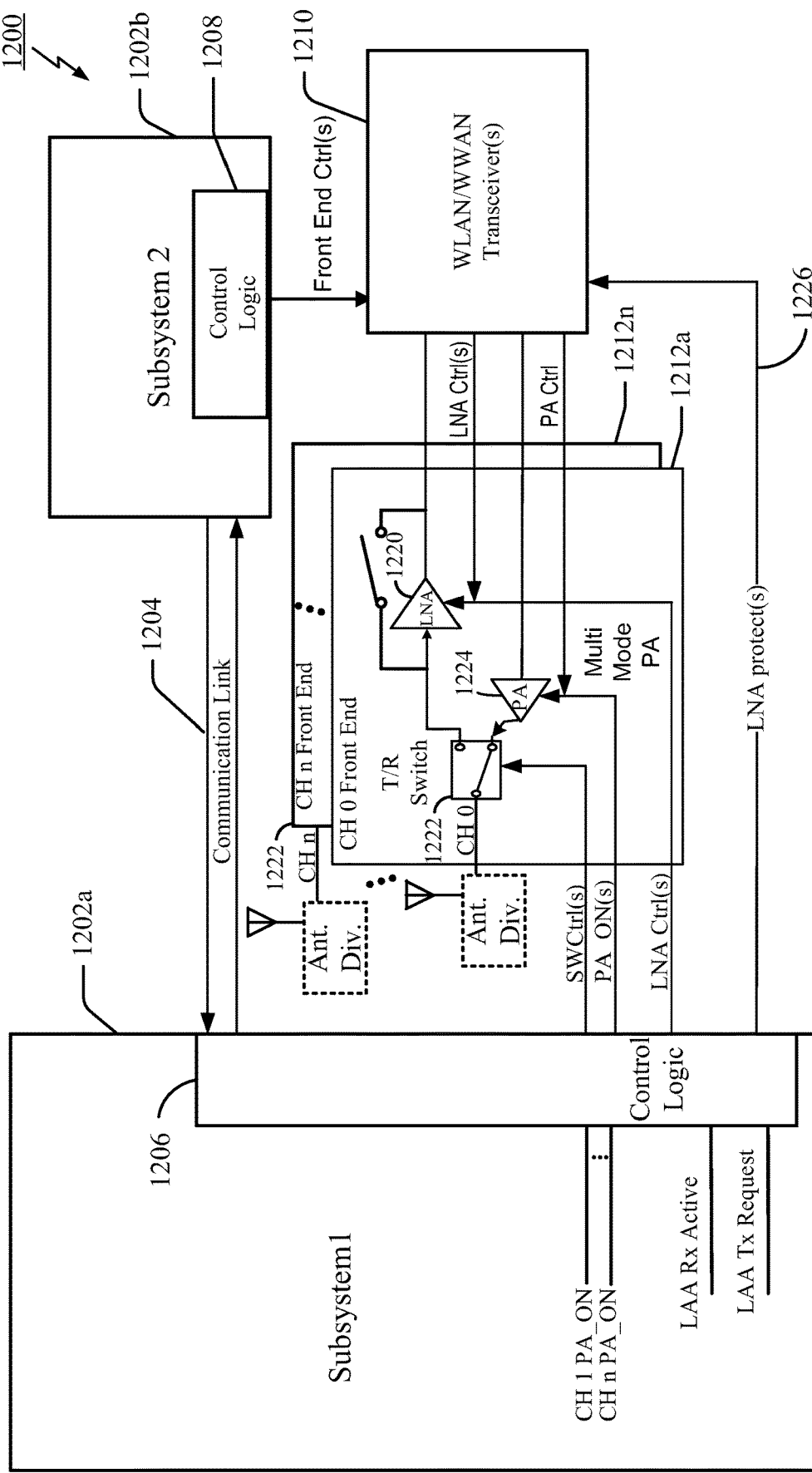
FIG. 12 illustrates a block diagram of an example an apparatus including two subsystems controlling one or more front ends of radio systems.

FIG. 12 illustrates another example of a system 1200 in a wireless device where there are two or more subsystems (e.g., systems on a chip (SOCs)) controlling independent radio system front ends having at least some overlapping portions. In particular, the overlapping portions allow for cases where first a first radio system, such as LAA, and a second radio system, such as a WLAN, share portions of the data path but not at the same time; e.g., an LNA of the WLAN system can be reused or repurposed for the LAA system. The system 1200 includes a subsystem 1 1202a and a subsystem 2 1202b. In an aspect, the two subsystems 1202a and 1204 may be communicatively coupled with a communication link 1204 in order to signal coordination between the two subsystems 1202a, 1202b.

As further illustrated the subsystems 1202a and 1202b may include respective control logic or protection logic 1206 and 1208 configured for coordination between the two subsystems 1202a, 1202b. In subsystem 1 1202a, the control logic 1006 is configured to receive various transmit on and receive on signals, which may originate with a WLAN/WWAN transceiver (e.g., 1210) or other logic, processors, subsystems, etc. in the wireless device. In the example of FIG. 12, the signals to control logic 1206 may include CH 0 through CH n PA ON (i.e., the transmit turn on signal for a WLAN system), and LAA Transmit Tx Request and LAA Receive Rx active signals (i.e., the WWAN transmit on and receive on signals). The control logic 1206 may be configured to utilize the input signals for controlling various PAs and LNAs, for example, in front end modules 1212a through 1212n that are reused or repurposed among at least the two subsystems 1202a, 1202b.

As further illustrated, control logic 1206 may be configured to send various signals to the front end modules 1212a-1212n including a PA control signal (i.e., a PA turn on or off to control a multi-mode PA 1224, for example), and an LNA control signal to control at least one LNA (e.g., control of LNA 1220 to either become disabled or to attenuate the gain of the LNA) in the front end modules 1212. Furthermore, control logic 1206 may be configured to further control the Transmit/Receive (T/R) switch 1222 with a switch control signal to disable or disconnect the path or coupling between the antenna (and antenna diversity/filtering) to either the PA or LNA.

The subsystem 2 (1202b) may also include control/protection logic 1208 that issues control signals to the WLAN/WWAN transceiver 1210, such as front end module control signals. These signals may be configured for protection of circuitry in the front end modules 1212 through control of WLAN/WWAN transceiver 1210 operation, in one example. As an example, FIG. 12 illustrates that, in response to the control signals, the LNA control and PA control signals are issued from the WLAN/WWAN transceiver 1210 to the front end modules 1212 for control of the PA and LNA components. The control signals from logic 1208 may also effect reuse or repurposing of the front end modules 1212 among the different subsystems and/or radio systems in the wireless device 1200. According to a further example, control logic 1206, as one example, may issue a further LNA protect signal 1226 to the WLAN/WWAN transceiver 1210 to protect downstream LNAs within the transceiver 1210, such as through disabling or attenuating the gain of such LNAs.

Figure 13:
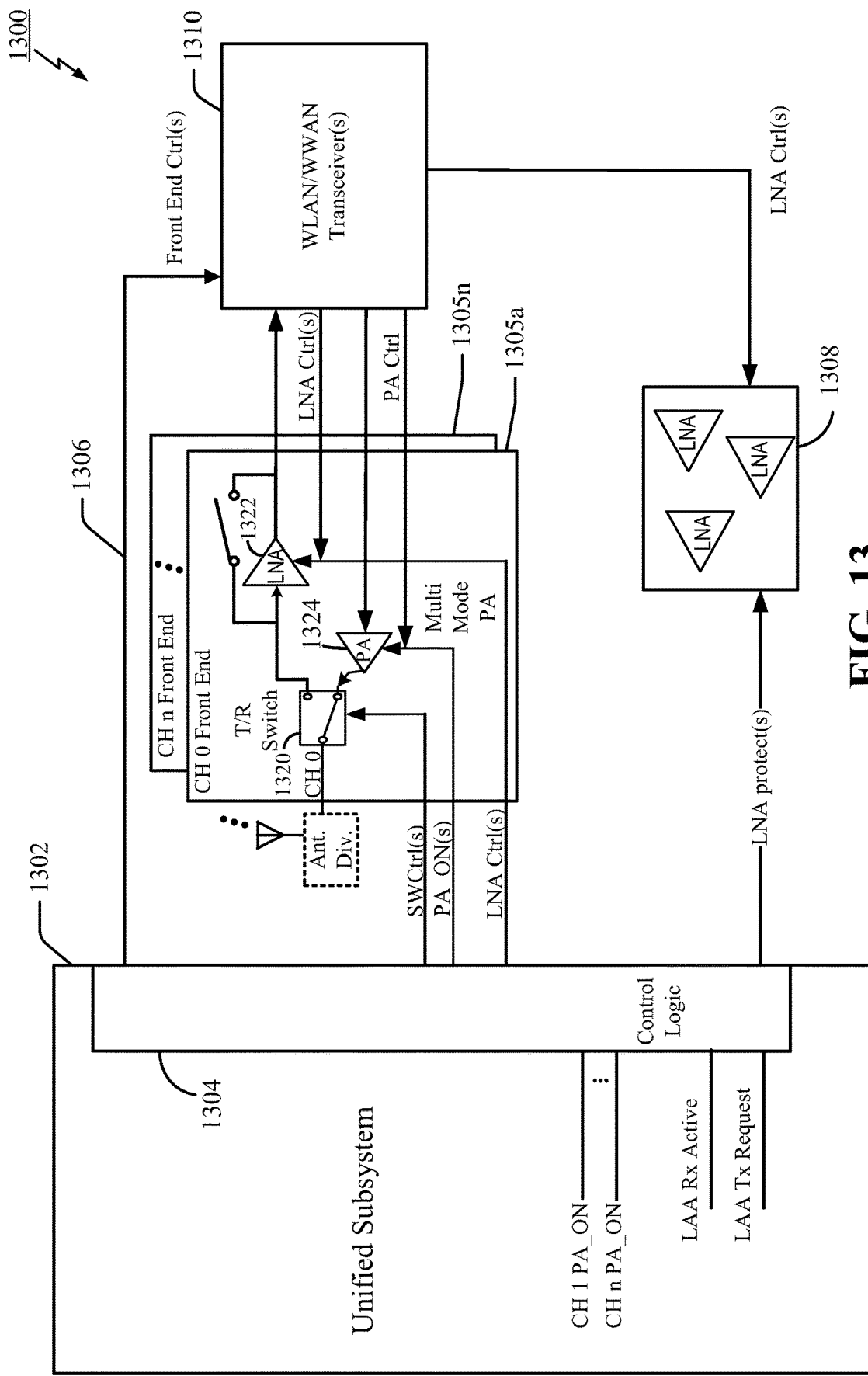
FIG. 13 illustrates a block diagram of an example of an apparatus including a unified subsystem controlling one or more front ends of radio systems.

FIG. 13 illustrates another example of a wireless device system 1300 where there is a unified subsystem 1302 that controls independent radio system front ends having at least some overlapping portions. In this example, the subsystem includes control or protection logic or circuitry 1304 within a single subsystem or system on a chip (SOC) that is configured control various control operations for the various radio systems in the wireless device 1300. Similar to the system of FIG. 9, the control logic circuitry 1304 receives input signals concerning PA and LNA transmit or receive requests, and in turn issues various command signals to the front end modules 1305a-1305n to control the PAs and LNAs therein, as well as a T/R switch (1320) control signal. In contrast to the system of FIG. 12, however, system 1300 having a unified or integrated subsystem includes direct control of the front end module with a control signal 1306 from logic 1304 to the WLAN/WWAN transceiver 1310.

In a further aspect, system 1300 includes direct control or protection of LNAs in other systems (illustrated by block 1308) from both logic 1304 and the WLAN/WWAN transceiver 1310.

A concern that may arise when utilizing the various methods and apparatus disclosed herein, such as real time blanking of signals, is that of power consumption. While the above presented methods and apparatus provide the benefit of real time blanking of signals to prevent either side from transmitting and thereby avoid damage to circuitry such as LNAs, this real time protection mechanism may exact a power consumption penalty on both radio systems as they are persistently searching for transmissions. Thus in a further embodiment, methods and apparatus may be provided to notify a WWAN radio, for example, if a WLAN radio is transmitting by reading messages sent between the two systems (e.g., the WWAN and WLAN systems), or vice versa, and then to immediately propagate this information to the radio system that is monitoring the channel for permission to transmit using external signaling and suspending the channel monitoring to avoid the persistent power consumption hit. The WWAN Radio can use the same mechanism to hand-shake with the WLAN radio so that it is aware that it is about to transmit and to avoid clashes between the two radio systems.

Figure 14:
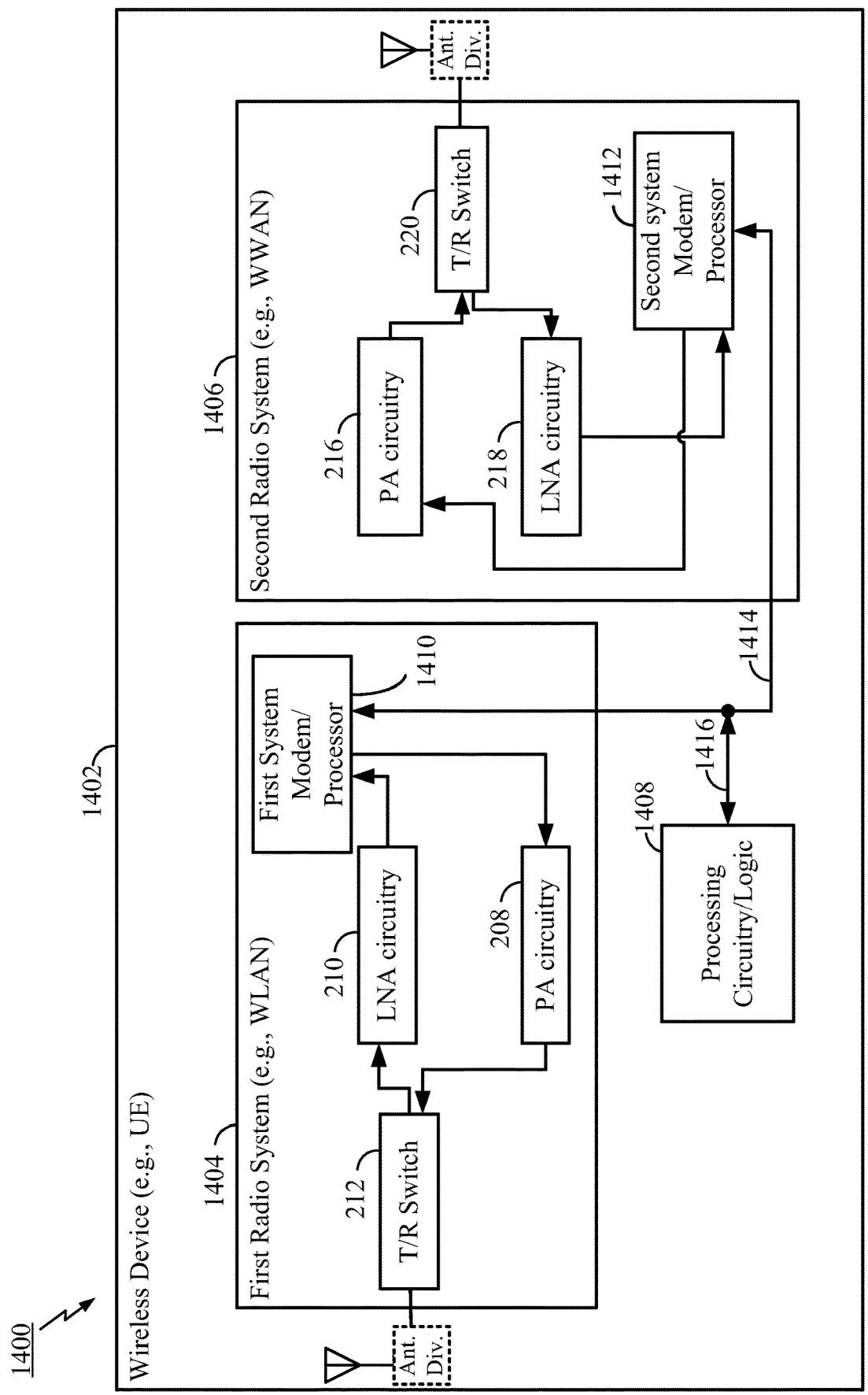
FIG. 14 illustrates a block diagram of an exemplary device for controlling coexistence between disparate radio systems in a wireless device using external signaling.

FIG. 14 illustrates an exemplary block diagram 1400 of a wireless device 1402 with coexistent first and second radio systems 1404 and 1406 that employs external signaling (i.e., signaling external to the first and second radio systems but within the wireless device) for controlling the radio systems in order to avoid the persistent power consumption discussed above. In particular, the device 1402 may include an external processing circuitry or logic 1408 that is configured to read messages sent between the first and second radio systems 1404 and 1406 to determine transmission states of the radios, and then to control the radio systems based on the read messages. The determined information derived from reading the messages between the radio systems may be propagated to at least those radio systems that are monitoring a particular channel for permissions to transmit, where the channel has a frequency spectrum shared by the radio systems 1404, 1406.

In the particular example of FIG. 14, the first radio system 1404 may include a first system modem or processor 1410, which controls the transmit and receive operations of the first radio system 1404. In an aspect, the first system modem 1410 includes functionality of monitoring a channel or wireless link for requesting permission to transmit over a shared frequency spectrum channel. Similarly, the second radio system 1406 may also include a second system modem or processor 1412, which controls the transmit and receive operations of the second radio system 1406 including monitoring of a channel or wireless link for the purposes of requesting permission to transmit over the shared channel. According to a further aspect, the modems 1410 and 1412 may be implemented with a general processor, an application specific processor, a DSP, or equivalent devices that may effect control of the radio systems 1404 or 1406, as well as receive inputs from external signaling, such as from processing circuitry 1408.

The device 1402 may further include interfaces or couplings 1414, which at least allow the radio systems 1404 and 1406 to communicate messages and information there between. In a further aspect, the processing circuitry 1408 may be communicatively coupled to the interfaces 1414 as shown by coupling 1416 for illustration purposes. Although processing circuit 1408 is illustrated with coupling 1416, it will be appreciated that processing circuitry 1408 may be alternatively coupled directly to both first system modem 1410 and second system modem 1412 to derive information concerning messaging between the first and second radio systems.

As mentioned above, the processing circuitry 1408 may be configured to propagate the read information derived from reading information, messages, commands, etc. that are communicated between the two radio systems 1404 and 1406. In particular, the processing circuity 1408 is configured to propagate information concerning current transmission status of a radio system using the wireless link or channel for transmission. In a particular aspect, at least the radio system(s) that is monitoring the channel in order to seek transmission permission on the channel may receive the read information concerning the transmission states of the various radio systems in the wireless device 1402.

In turn, the recipient radio system may be configured to suspend its monitoring of the shared channel for a predetermined time period to avoid power consumption that results from a continuous or persistent monitoring of the channel to seek transmission thereon. In one example with WLAN and WWAN radio systems, if the WLAN system (e.g., the first radio system 1404) is transmitting, information concerning the WLAN's transmit status, which is derived from reading messages between the WLAN and WWAN radios, is then immediately propagated to the WWAN radio (e.g., the second radio system 1406), which is monitoring the channel for permission to transmit. The monitoring operation of WWAN radio system would then be suspended for some predetermined timer period so as to avoid or reduce power consumption arising from persistent monitoring of the channel.

According to another aspect, the present methods and mechanisms as presented in FIG. 14 may also be applied to handshaking between the WWAN and WLAN radio systems to avoid simultaneous transmission conflicts. For example, the WWAN radio may utilize the same mechanism of receiving the propagated read information to perform coordination or handshaking with the WLAN radio so that the WWAN radio is aware that the WLAN radio about to transmit and to thereby prevent clashes between the two radio systems.

Figure 15:
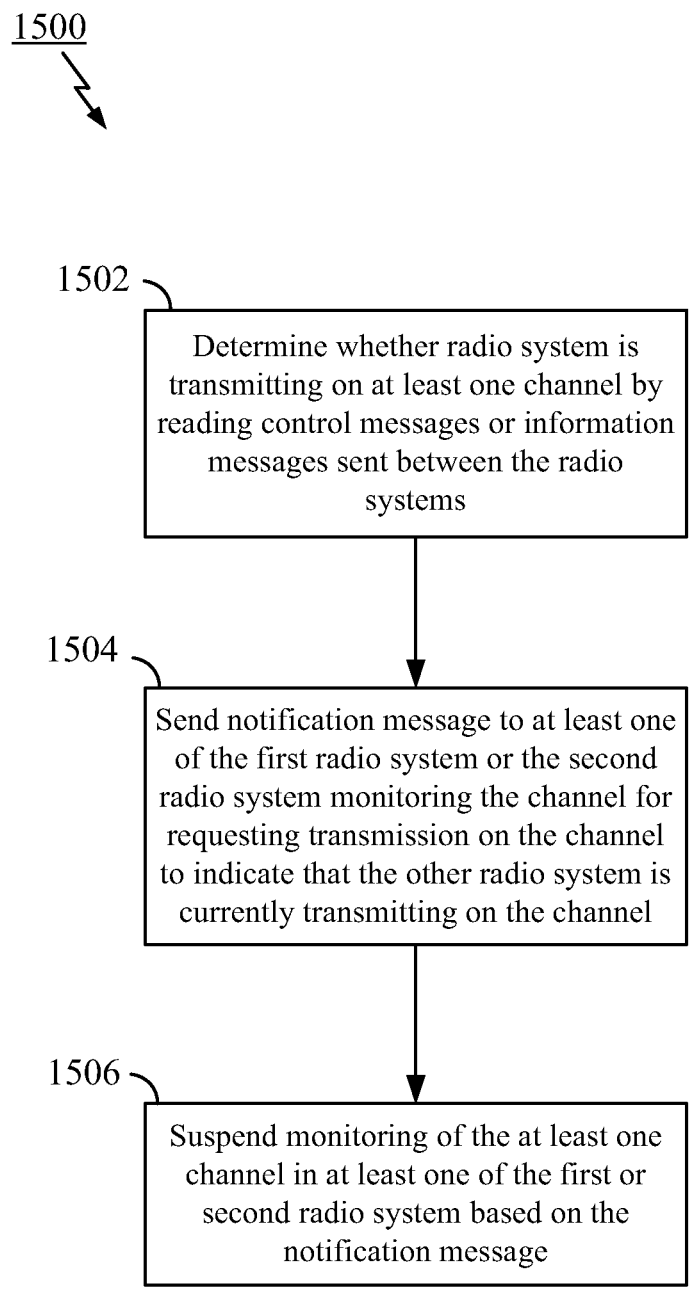
FIG. 15 illustrates a flow diagram of another exemplary method for controlling radio frequency concurrency in a wireless device.

FIG. 15 illustrates a flow diagram of an exemplary method 1500 for controlling radio frequency concurrency in a wireless device, such as with the device and systems illustrated in FIG. 14. Method 1500 is configured for controlling a wireless device including coexistent first and second radio systems to avoid damage from each other during transmissions on at least one channel sharing a frequency spectrum between the first and second radio systems, similar to the methods discussed before. Method 1500 further includes controlling the first or second radio system through determining whether at least one of the first or second radio systems is transmitting on at least one channel by reading control messages or information messages sent between the first and second radio systems within the wireless device as shown in block 1502. It is noted that this process in block 1502 may be accomplished by the processing circuitry 1408 illustrated in FIG. 14, or by equivalents thereof.

Next, method 1500 includes sending a notification message based on the determination that one of the first or second radio system is transmitting or about to transmit as shown in block 1504. The message is propagated or sent to at least one of the first radio system or the second radio system that is monitoring the at least one channel for requesting transmission on the channel, and the notification message configured to indicate that the other radio system is currently transmitting on the channel. This process may also be accomplished by the processing circuitry 1408 illustrated in FIG. 14, or by equivalents thereof, in conjunction with the first and second system modems/processors 1410, 1412, or equivalents thereof.

Furthermore, method 1500 may include suspending monitoring of the at least one channel for requesting transmission on the at least one channel in at least one of the first or second radio system based on the notification message as shown in block 1506. This process in block 1506 may be effectuated by the first and second system modems/processors 1410, 1412, or equivalents thereof. In yet a further aspect of method 1500, the processes may include the resumption of monitoring of the at least one channel after a predetermined time period. In another alternative, the processing circuitry 1408 may be configured to issue a further notification message that is configured to indicate that the other radio system (i.e., the radio system that was just previously transmitting as indicated in the first notification message) is no longer transmitting on the at least one channel, and resumption of monitoring in the other radio system may be initiated based on this further notification message. In other aspects, the notification message may be configured to be a continuous state indication of the transmit states of the radio systems, and suspension and/or resumption of monitoring may be determined based on monitoring of the state of the notification message from the processing circuitry 1108.

In still further aspects, the methodology of method 1500 may alternatively include receiving the notification message in the first radio system that allows the first radio system to know that the second radio system is about to transmit on the at least one channel. Then, a handshake synchronization may be initiated between the first radio system and the second radio system in order to avoid a conflict between the first and second radio systems.

In keeping with the previously discussed systems, it is noted that method 1500 may be configured such that the first radio system is operable with a wireless Wide Area Network (WWAN) according to one of LTE-U technology, LTE, Licensed Assist Access (LAA) technology, enhanced LAA (eLAA) technology, E-UTRA Band 47, or 5G New Radio (NR) technology. Furthermore, the second radio system may be operable with a Wireless Local Area Network (WLAN) according to WiFi technology.

It is noted that the methods and apparatus of FIGS. 14 and 15 may provide better coexistence management between two systems that share similar spectrum or are impacted by the other's transmissions. These methods and apparatus also save power by avoiding persistent searches if the channel is already known to be in use. This information can be supplemented by awareness or sensing of the channel of interest that is being sent or transmitted.

Figure 16:
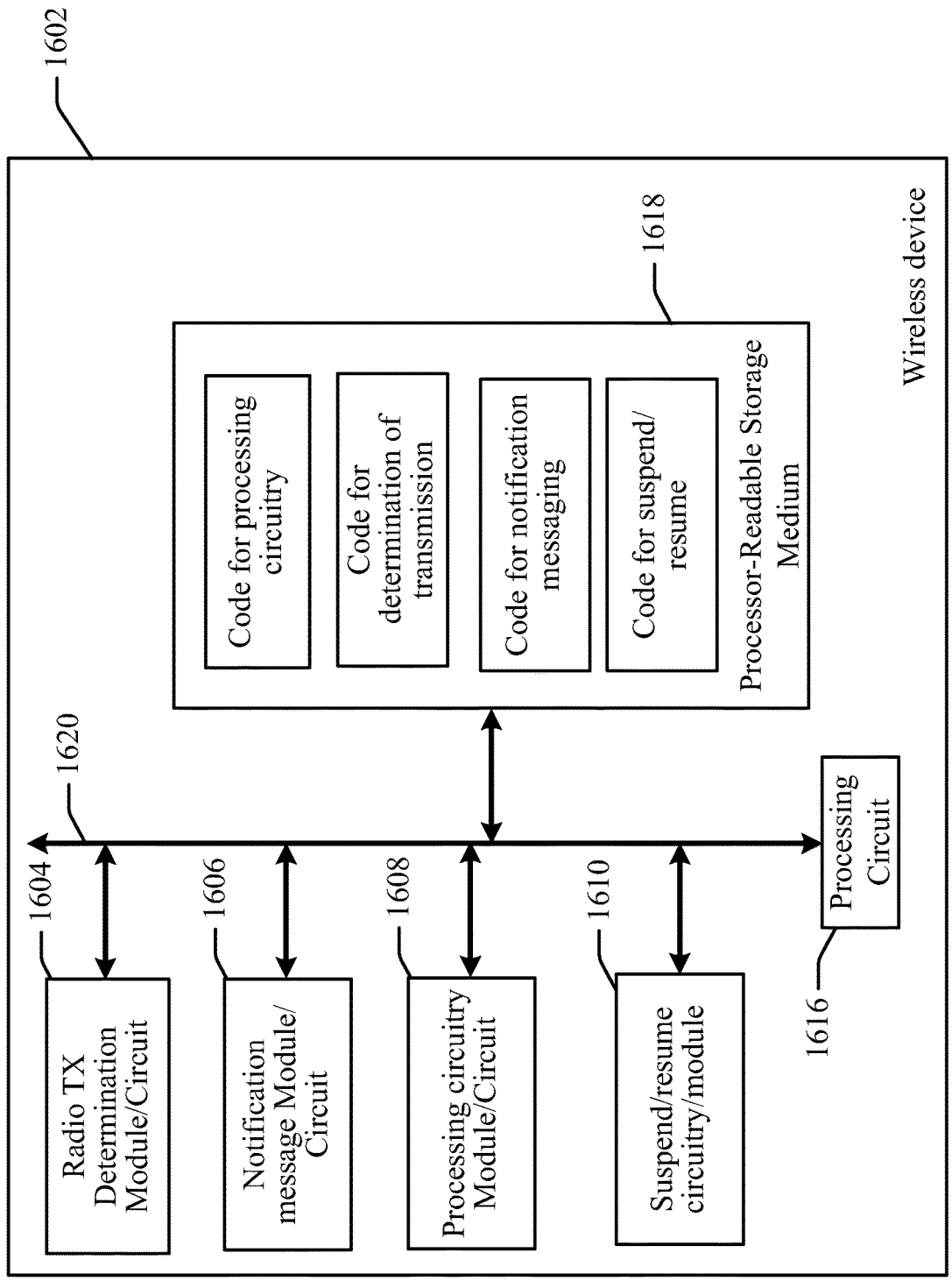
FIG. 16 a block diagram showing another simplified example of a hardware implementation for an apparatus within a wireless device that provides control of coexistent radio systems.

FIG. 16 illustrates a diagram showing a simplified example of a hardware implementation for a wireless device 1602 or an apparatus within a wireless device that provides control of concurrent radio systems. Device 1602 typically has a controller or processor 1616 that may include one or more microprocessors, microcontrollers, digital signal processors, sequencers and/or state machines. The device 1602 may be implemented with a bus architecture, represented generally by the bus 1620. The bus 1620 may include any number of interconnecting buses and bridges depending on the specific application of the processing circuit 1616 and the overall design constraints. The bus 1620 links together various circuits including one or more processors and/or hardware modules, represented by the modules or circuits 1604, 1606, 1608, and 1610, and the computer-readable storage medium 1618.

The processor 1616 is responsible for general processing, including the execution of software, code and/or instructions stored on the computer-readable storage medium 1618. The computer-readable storage medium may include a non-transitory storage medium. The software, when executed by the processor 1616, causes the device 1602 and the processing circuit 1616, in particular, to perform the various functions described supra for any particular apparatus. The computer-readable storage medium 1618 may be used for storing data that is manipulated by the processor 1616 when executing software.

The device 1602 further includes at least one of the modules 1604, 1606, 1608, and 1610. The modules 1604, 1606, 1608, and 1610 may be software modules running in the processor 1616, resident/stored in the computer-readable storage medium 1618, one or more hardware modules coupled to the processor 1616, or some combination thereof. The modules 1604, 1606, 1608, and 1610 may include microcontroller instructions, state machine configuration parameters, or some combination thereof. As illustrated, mode 1604 may be configured to perform determination of whether one radio system of two radio systems in the device is transmitting on at least one channel by reading control messages or information messages sent between the radio systems. Furthermore, the module 1606 may be configured for notification messaging between radio systems, such as sending the notification message one of the first radio system or the second radio system monitoring the channel for requesting transmission on the channel to indicate that the other radio system is currently transmitting on the channel.

Moreover, module 1608 may be configured for suspending monitoring of the at least one channel in at least one of the first or second radio system based on the notification message. Furthermore, module 1608 may be configured for resuming monitoring of the at least one channel after receipt in one of the first or second radio systems of a further notification message configured to indicate that the other radio system is no longer transmitting on the at least one channel. The medium 1618 may be configured with various code for controlling and/or configuring the control logic circuitry/modules 1604, 1606, 1608, and 1610 operable according to the various different examples disclosed herein (See e.g., FIGS. 14 and 15).

Figure 17:
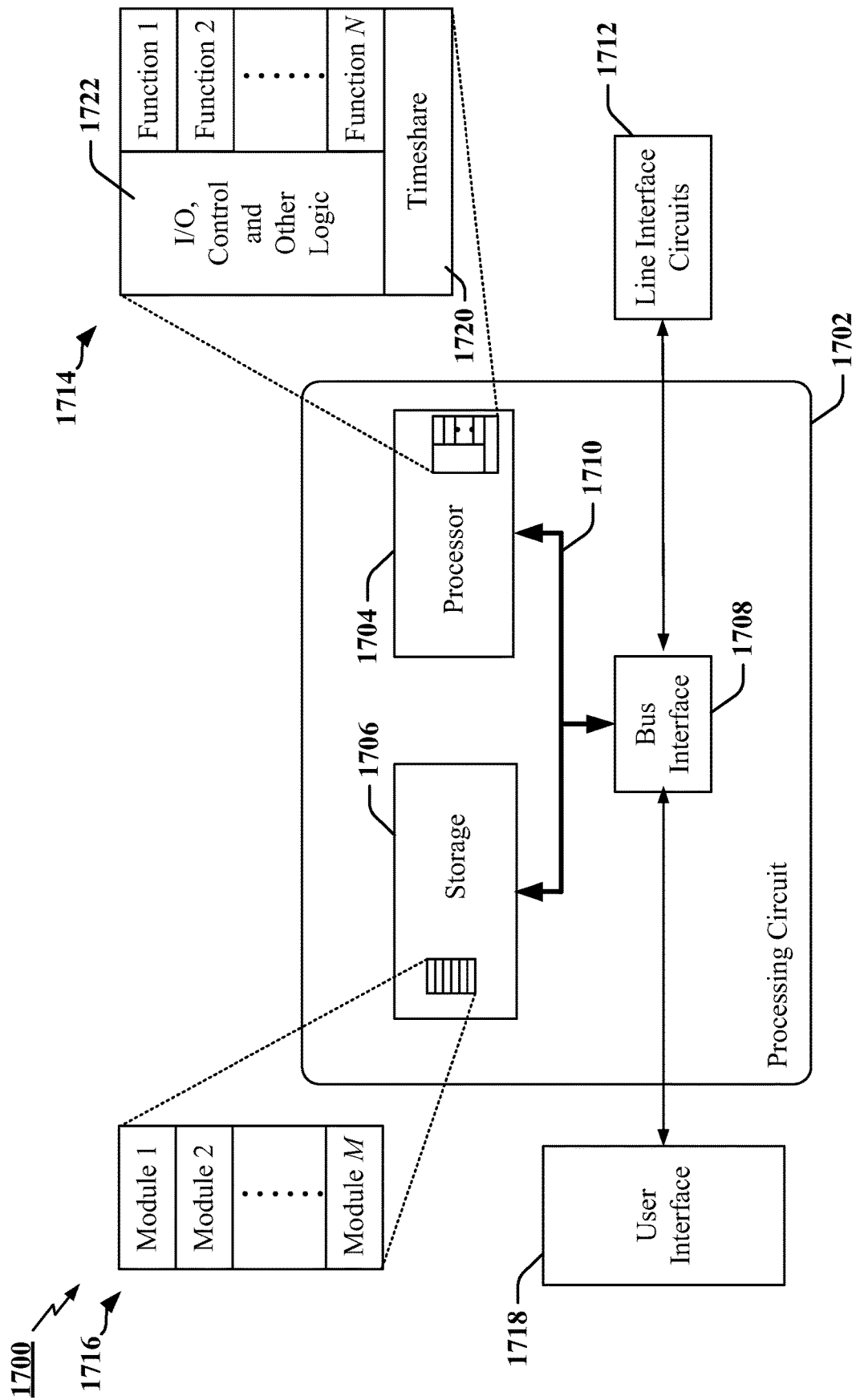
FIG. 17 is a block diagram illustrating an example of an apparatus employing a processing circuit that may be adapted according to certain aspects disclosed herein.

FIG. 17 is a diagram illustrating an example of a hardware implementation for an apparatus 1700 employing a processing circuit 1702 that may be configured to perform one or more functions disclosed herein. In accordance with various aspects of the disclosure, an element, or any portion of an element, or any combination of elements as disclosed herein may be implemented using the processing circuit 1702. The processing circuit 1702 may include one or more processors 1704 that are controlled by some combination of hardware and software modules. Examples of processors 1704 include microprocessors, microcontrollers, digital signal processors (DSPs), SoCs, ASICs, field programmable gate arrays (FPGAs), programmable logic devices (PLDs), state machines, sequencers, gated logic, discrete hardware circuits, and other suitable hardware configured to perform the various functionality described throughout this disclosure. The one or more processors 1704 may include specialized processors that perform specific functions, and that may be configured, augmented or controlled by one of the software modules 1716. The one or more processors 1704 may be configured through a combination of software modules 1716 loaded during initialization, and further configured by loading or unloading one or more software modules 1716 during operation. In various examples, the processing circuit 1702 may be implemented using a state machine, sequencer, signal processor and/or general-purpose processor, or a combination of such devices and circuits.

In the illustrated example, the processing circuit 1702 may be implemented with a bus architecture, represented generally by the bus 1710. The bus 1710 may include any number of interconnecting buses and bridges depending on the specific application of the processing circuit 1702 and the overall design constraints. The bus 1710 links together various circuits including the one or more processors 1704, and storage 1706. Storage 1706 may include memory devices and mass storage devices, and may be referred to herein as computer-readable media and/or processor-readable media. The bus 1710 may also link various other circuits such as timing sources, timers, peripherals, voltage regulators, and power management circuits. A bus interface 1708 may provide an interface between the bus 1710 and one or more line interface circuits or transceivers 1712. Transceiver 1712 may be provided for each networking technology supported by the processing circuit. In some instances, multiple networking technologies may share some or all of the circuitry or processing modules found in a transceiver 1712. Each transceiver 1712 provides a means for communicating with various other apparatus over a transmission medium. Depending upon the nature of the apparatus 1700, a user interface 1718 (e.g., keypad, display, speaker, microphone, joystick) may also be provided, and may be communicatively coupled to the bus 1710 directly or through the bus interface 1708.

A processor 1704 may be responsible for managing the bus 1710 and for general processing that may include the execution of software stored in a computer-readable medium that may include the storage 1706. In this respect, the processing circuit 1702, including the processor 1704, may be used to implement any of the methods, functions and techniques disclosed herein. The storage 1706 may be used for storing data that is manipulated by the processor 1704 when executing software, and the software may be configured to implement any one of the methods disclosed herein.

One or more processors 1704 in the processing circuit 1702 may execute software. Software shall be construed broadly to mean instructions, instruction sets, code, code segments, program code, programs, subprograms, software modules, applications, software applications, software packages, routines, subroutines, objects, executables, threads of execution, procedures, functions, algorithms, etc., whether referred to as software, firmware, middleware, microcode, hardware description language, or otherwise. The software may reside in computer-readable form in the storage 1706 or in an external computer-readable medium. The external computer-readable medium and/or storage 1706 may include a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a "flash drive," a card, a stick, or a key drive), RAM, ROM, a programmable read-only memory (PROM), an erasable PROM (EPROM) including EEPROM, a register, a removable disk, and any other suitable medium for storing software and/or instructions that may be accessed and read by a computer. The computer-readable medium and/or storage 1706 may also include, by way of example, a carrier wave, a transmission line, and any other suitable medium for transmitting software and/or instructions that may be accessed and read by a computer. Computer-readable medium and/or the storage 1706 may reside in the processing circuit 1702, in the processor 1704, external to the processing circuit 1702, or be distributed across multiple entities including the processing circuit 1702. The computer-readable medium and/or storage 1706 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The storage 1706 may maintain software maintained and/or organized in loadable code segments, modules, applications, programs, etc., which may be referred to herein as software modules 1716. Each of the software modules 1716 may include instructions and data that, when installed or loaded on the processing circuit 1702 and executed by the one or more processors 1704, contribute to a run-time image 1714 that controls the operation of the one or more processors 1704. When executed, certain instructions may cause the processing circuit 1702 to perform functions in accordance with certain methods, algorithms and processes described herein.

Some of the software modules 1716 may be loaded during initialization of the processing circuit 1702, and these software modules 1716 may configure the processing circuit 1702 to enable performance of the various functions disclosed herein. For example, some software modules 1716 may configure internal devices and/or logic circuits 1722 of the processor 1704, and may manage access to external devices such as the transceiver 1712, the bus interface 1708, the user interface 1718, timers, mathematical coprocessors, and so on. The software modules 1716 may include a control program and/or an operating system that interacts with interrupt handlers and device drivers, and that controls access to various resources provided by the processing circuit 1702. The resources may include memory, processing time, access to the transceiver 1712, the user interface 1718, and so on.

One or more processors 1704 of the processing circuit 1702 may be multifunctional, whereby some of the software modules 1716 are loaded and configured to perform different functions or different instances of the same function. The one or more processors 1704 may additionally be adapted to manage background tasks initiated in response to inputs from the user interface 1718, the transceiver 1712, and device drivers, for example. To support the performance of multiple functions, the one or more processors 1704 may be configured to provide a multitasking environment, whereby each of a plurality of functions is implemented as a set of tasks serviced by the one or more processors 1704 as needed or desired. In one example, the multitasking environment may be implemented using a timesharing program 1720 that passes control of a processor 1704 between different tasks, whereby each task returns control of the one or more processors 1704 to the timesharing program 1720 upon completion of any outstanding operations and/or in response to an input such as an interrupt. When a task has control of the one or more processors 1704, the processing circuit is effectively specialized for the purposes addressed by the function associated with the controlling task. The timesharing program 1720 may include an operating system, a main loop that transfers control on a round-robin basis, a function that allocates control of the one or more processors 1704 in accordance with a prioritization of the functions, and/or an interrupt driven main loop that responds to external events by providing control of the one or more processors 1704 to a handling function.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

Some portions of the preceding detailed description have been presented in terms of algorithms or symbolic representations of operations on binary digital electronic signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involves physical manipulation of physical quantities. Typically, although not necessarily, such quantities may take the form of electrical or magnetic signals capable of being stored, transferred, combined, compared or otherwise manipulated as electronic signals representing information. It has proven convenient at times, principally for reasons of common usage, to refer to such signals as bits, data, values, elements, symbols, characters, terms, numbers, numerals, information, or the like. It should be understood, however, that all of these or similar terms are to be associated with appropriate physical quantities and are merely convenient labels.

Some portions of the preceding detailed description have been presented in terms of algorithms or symbolic representations of operations on binary digital electronic signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involves physical manipulation of physical quantities. Typically, although not necessarily, such quantities may take the form of electrical or magnetic signals capable of being stored, transferred, combined, compared or otherwise manipulated as electronic signals representing information. It has proven convenient at times, principally for reasons of common usage, to refer to such signals as bits, data, values, elements, symbols, characters, terms, numbers, numerals, information, or the like. It should be understood, however, that all of these or similar terms are to be associated with appropriate physical quantities and are merely convenient labels.

Unless specifically stated otherwise, as apparent from the following discussion, it is appreciated that throughout this specification discussions utilizing terms such as "processing," "computing," "calculating,", "identifying", "determining", "establishing", "obtaining", and/or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device. In the context of this particular patent application, the term "specific apparatus" may include a general purpose computer once it is programmed to perform particular functions pursuant to instructions from program software.

Reference throughout this specification to "one example", "an example", "certain examples", or "exemplary implementation" means that a particular feature, structure, or characteristic described in connection with the feature and/or example may be included in at least one feature and/or example of claimed subject matter. Thus, the appearances of the phrase "in one example", "an example", "in certain examples" or "in some implementations" or other like phrases in various places throughout this specification are not necessarily all referring to the same feature, example, and/or limitation. Furthermore, the particular features, structures, or characteristics may be combined in one or more examples and/or features.

Several aspects of wireless communication networks such as WLAN and WWAN networks, and wireless devices operable therein have been presented with reference to an exemplary implementation. As those skilled in the art will readily appreciate, various aspects described throughout this disclosure may be extended to other telecommunication systems, network architectures and communication standards. By way of example, various aspects may be implemented within other systems defined by 3GPP, such as 5G NR, Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standards, network architectures, and/or communication standards employed will depend on the specific applications and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-17 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-17 may be configured to perform one or more of the methods, features, or steps described herein.

The present description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method for controlling a wireless device including coexistent radio frequency (RF) first and second radio systems, the method comprising:

detecting in a control logic circuitry when a first turn on signal is issued to the first radio system to transmit signals with a transmit circuitry in the first radio system; and modifying operation of the second radio system with the control logic circuity including at least one of modifying operation of a receiver circuitry in the second radio system or modifying operation of a transmit circuitry in the second radio system including triggering modification of the operation of the transmit or the receiver circuitry in the second radio system with the control logic circuitry, wherein the control logic circuitry is configured to:

receive the first turn on signal issued to the first radio system and a second turn on signal issued to the second radio system; and send an output signal to the second radio system responsive to the received first turn on signal, wherein the output signal triggers modification of the operation of at least one of the transmit or the receiver circuitry in the second radio system.

2. The method of claim 1, wherein modifying the operation of the receiver circuitry in the second radio system further comprises:

disabling at least one low noise amplifier (LNA) in the second radio system by selectively bypassing the at least one LNA to protect the at least one LNA from transmissions from at least one of the first radio system or the second radio system.

3. The method of claim 2, wherein selectively bypassing the at least one LNA includes coupling an input of the at least one LNA to ground.

4. The method of claim 1, wherein modifying the operation of the receiver circuitry in the second radio system further comprises:

selectively reducing a gain of at least one low noise amplifier (LNA) in the second radio system.

5. The method of claim 4, wherein selectively reducing the gain of the at least one LNA includes selectively switching between a plurality of gains.

6. The method of claim 5, wherein selectively switching between the plurality of gains includes selecting an attenuation network from a plurality of attenuation networks having respective gain attenuations and coupling the attenuation network to the at least one LNA.

7. The method of claim 1, wherein the transmit circuitry of the first or the second radio system comprises a power amplifier (PA).

8. The method of claim 1, wherein the first and second radio systems share a common frequency spectrum.

9. The method of claim 1, wherein the first and second radio systems are operable in respective frequency bands that are close in frequency such that transmissions of one radio system affect at least one of receiver and transmit circuitry in the other radio system.

10. The method of claim 1, further comprising:

when at least one front end transmit/receive module of a plurality of front end transmit/receive modules is operable for transmitting, controlling operation of one or more of remaining front end transmit/receive modules of the plurality of front end transmit/receive modules to provide protection from the transmitting front end transmit/receive module or reduction of interference with the transmitting front end transmit/receive module, wherein one of the first or second radio systems includes the plurality of front end transmit/receive modules, and wherein each of the plurality of front end transmit/receive modules is configured to be operable independent of other front end transmit/receive modules in the plurality of front end transmit/receive modules.

11. The method of claim 10, wherein controlling the operation of the one or more of the remaining front end transmit/receive modules of the plurality of front end transmit/receive modules includes one of disabling or modifying operation of one of transmit or receiver circuitries in the one or more of the remaining front end transmit/receive modules.

12. The method of claim 1, further comprising:
controlling a receiver circuitry in one of the first or second radio systems including a low noise amplifier (LNA) in a power saving gain bypass mode through modifying or disabling operation of the LNA in the power saving gain bypass mode.

13. The method of claim 12, wherein controlling the receiver circuitry in one of the first or second radio systems further comprises:
selectively modifying operation of one or more of a plurality of LNAs,
wherein at least one of the first and second radio systems includes the plurality of LNAs.

14. The method of claim 13, wherein selectively modifying the operation of the one or more of the plurality of LNAs includes selectively changing a gain of the one or more of the plurality of LNAs.

15. The method of claim 13, wherein selectively modifying the operation of the one or more of the plurality of LNAs is determined based on one or more of operation parameters of the first or the second radio system, and a technology of the first or the second radio system.

16. The method of claim 1, wherein the control logic circuitry is further configured to issue a signal to disable a low noise amplifier (LNA) in the receiver circuitry of the second radio system when the first radio system issues a command to turn on a power amplifier (PA) in the transmit circuitry of the first radio system.

17. The method of claim 1, wherein the control logic circuitry is further configured to issue a signal to disable a low noise amplifier (LNA) in a receiver circuitry of the first radio system when the second radio system issues a command to turn on a power amplifier (PA) in the transmit circuitry of the second radio system.

18. The method of claim 1, wherein the control logic circuitry is further configured to issue a signal to disable a power amplifier (PA) in the transmit circuitry of the second radio system when the first radio system issues a command to turn on a power amplifier (PA) in the transmit circuitry of the first radio system.

19. The method of claim 1, wherein the control logic circuitry is further configured to issue a signal to disable a power amplifier (PA) in the transmit circuitry of the first radio system when the second radio system issues a command to turn on a power amplifier (PA) in the transmit circuitry of the second radio system.

20. The method of claim 1, wherein the control logic circuitry is further configured to disable the transmit circuitry in the first and second radio systems when both the first radio system and the second radio system issue signals indicating that power amplifiers of the transmit circuitry in the first and second radio systems be turned off.

21. The method of claim 1, wherein the control logic circuitry is further configured to turn off receiver circuitries in both the first and second radio systems when at least the transmit circuitry of the first radio system is turned on.

22. The method of claim 1, wherein the first radio system is operable with a Wireless Wide Area Network (WWAN) according to one of LTE-U technology, LTE, Licensed Assist Access (LAA) technology, enhanced LAA (eLAA) technology, E-UTRA Band 47, or 5G New Radio (NR) technology.

23. The method of claim 1, wherein the second radio system is operable with a Wireless Local Area Network (WLAN) according to WiFi technology.

24. The method of claim 1, wherein at least one of the first and second radio systems are respectively communicatively coupled to one or more antennas in the wireless device through an antenna diversity switch.

25. The method of claim 1, further comprising:
controlling one of transmit or receiver circuitry in at least one of the first and second radio systems with a transmit/receive (T/R) switching function to selectively disable a path from at least an antenna to a transmit or receiver circuitry.

26. The method of claim 1, wherein components of the first radio system may be utilized by the second radio system for at least one of transmitting or receiving RF signals; and
controlling one of the first or second radio systems includes controlling components used in the first radio system by the second radio system or components used in the second radio system by the first radio system.

27. A wireless device operable with coexistent radio frequency (RF) first and second radio systems, the wireless device comprising:
control logic circuitry configured to:
receive a first turn on signal issued by a transceiver in the wireless device to turn on at least a transmit circuitry of the first radio system and a second turn on signal that turns on the second radio system; and
control at least one of a receiver circuitry or a transmit circuitry in the second radio system when the first turn on signal is issued to turn on at least the transmit circuitry of the first radio system through sending an output signal responsive to the received first turn on signal to the second radio system to trigger modification of operation of the transmit or the receiver circuitry in the second radio system.

28. The wireless device of claim 27, wherein the control logic circuitry comprises one or more of logic gates, programmable logic devices (PLDs), or field programmable gate arrays (FPGAs).

29. The wireless device of claim 27, wherein controlling the at least one of the receiver circuitry or the transmit circuitry comprises modifying operation of at least one of the receiver circuitry or the transmit circuitry in the second radio system to at least one of:
(a) protect the receiver circuitry of the second radio system, or
(b) reduce interference from at least the transmit circuitry of the first radio system.

30. The wireless device of claim 29, wherein the control logic circuitry is further configured to trigger modification of operation of the receiver circuitry in the second radio system by disabling at least one low noise amplifier (LNA) in the second radio system by selectively bypassing the at least one LNA to protect the at least one LNA from transmissions from at least one of the first radio system or the second radio system.

31. The wireless device of claim 30, wherein selectively bypassing the at least one LNA includes coupling an input of the at least one LNA to ground.

32. The wireless device of claim 29, wherein modifying the operation of the receiver circuitry in the second radio system further comprises:
selectively reducing a gain of at least one low noise amplifier (LNA) in the second radio system.

33. The wireless device of claim 32, wherein selectively reducing the gain of the at least one LNA includes selectively switching between a plurality of gains.

34. The wireless device of claim 33, wherein selectively switching between the plurality of gains includes selecting an attenuation network from a plurality of attenuation networks having respective gain attenuations and coupling the attenuation network to the at least one LNA.

35. The wireless device of claim 27, wherein the transmit circuitry of the first or the second radio system comprises a power amplifier (PA).

36. The wireless device of claim 27, wherein the first and second radio systems share a common frequency spectrum.

37. The wireless device of claim 27, wherein the first and second radio systems are operable in respective frequency bands that are close in frequency such that transmissions of one radio system affect at least one of receiver and transmit circuitries in the other radio system.

38. The wireless device of claim 27, further comprising:
one of the first or second radio systems including a plurality of front end transmit/receive modules wherein each of the plurality of front end transmit/receive modules is configured to be operable independent of other front end transmit/receive modules in the plurality of front end transmit/receive modules,
wherein the control logic circuitry is further configured to when at least one of the front end transmit/receive modules of the plurality of front end transmit/receive modules is operable for transmitting, control operation of one or more of remaining front end transmit/receive modules of the plurality of front end transmit/receive modules to provide protection from the transmitting front end transmit/receive module or reduction of interference with the transmitting front end transmit/receive module.

39. The wireless device of claim 38, wherein controlling the operation of the one or more of the remaining front end transmit/receive modules of the plurality of front end transmit/receive modules includes one of disabling or modifying operation of one of transmit or receiver circuitries in the one or more of the remaining front end transmit/receive modules.

40. The wireless device of claim 27, wherein the control logic circuitry is further configured to
control a receiver circuitry in one of the first or second radio systems including a low noise amplifier (LNA) in a power saving gain bypass mode through modifying or disabling operation of the LNA in the power saving gain bypass mode.

41. The wireless device of claim 40, wherein controlling the receiver circuitry in one of the first or second radio systems further comprises:
selectively modifying operation of one or more of a plurality of LNAs,
wherein at least one of the first and second radio systems includes the plurality of LNAs.

42. The wireless device of claim 41, wherein selectively modifying the operation of the one or more of the plurality of LNAs includes selectively changing a gain of the one or more of the plurality of LNAs.

43. The wireless device of claim 41, wherein selectively modifying the operation of the one or more of the plurality of LNAs is determined based on one or more of operation parameters of the first or the second radio system, and a technology of the first or the second radio system.

44. The wireless device of claim 27, wherein the control logic circuitry is further configured to issue a signal to disable a low noise amplifier (LNA) in the receiver circuitry of the second radio system when the first radio system issues a command to turn on a power amplifier (PA) in the transmit circuitry of the first radio system.

45. The wireless device of claim 27, wherein the control logic circuitry is further configured to issue a signal to disable a low noise amplifier (LNA) in a receiver circuitry of the first radio system when the second radio system issues a command to turn on a power amplifier (PA) in the transmit circuitry of the second radio system.

46. The wireless device of claim 27, wherein the control logic circuitry is further configured to issue a signal to disable a power amplifier (PA) in the transmit circuitry of the second radio system when the first radio system issues a command to turn on a power amplifier (PA) in the transmit circuitry of the first radio system.

47. The wireless device of claim 27, wherein the control logic circuitry is further configured to issue a signal to disable a power amplifier (PA) in the transmit circuitry of the first radio system when the second radio system issues a command to turn on a power amplifier (PA) in the transmit circuitry of the second radio system.

48. The wireless device of claim 27, wherein the control logic circuitry is further configured to disable the transmit circuitries in the first and second radio systems when both the first radio system and the second radio system receive signals indicating that power amplifiers of the transmit circuitries in the first and second radio systems be turned off.

49. The wireless device of claim 27, wherein the control logic circuitry is further configured to turn off receiver circuitries in both the first and second radio systems when at least the transmit circuitry of the first radio system is turned on.

50. The wireless device of claim 27, wherein the first radio system is operable with a Wireless Wide Area Network (WWAN) according to one of LTE-U technology, LTE, Licensed Assist Access (LAA) technology, enhanced LAA (eLAA) technology, E-UTRA Band 47, or 5G New Radio (NR) technology.

51. The wireless device of claim 27, wherein the second radio system is operable with a Wireless Local Area Network (WLAN) according to WiFi technology.

52. The wireless device of claim 27, wherein at least one of the first and second radio systems are respectively communicatively coupled to one or more antennas in the wireless device through an antenna diversity switch.

53. The wireless device of claim 27, wherein the control logic circuitry is distributed between at least two subsystems in the wireless device.

54. The wireless device of claim 27, wherein the control logic circuitry is integrated within a single subsystem within the wireless device.

55. A wireless device operable with coexistent radio frequency (RF) first and second radio systems, the wireless device comprising:
means for receiving a first turn on signal issued by a transceiver in the wireless device to turn on at least a transmit circuitry of the first radio system and a second turn on signal that turns on the second radio system; and
means for controlling at least one of a receiver circuitry or a transmit circuitry in the second radio system when the first turn on signal is issued to turn on at least the transmit circuitry of the first radio system through sending an output signal responsive to the received first turn on signal to the second radio system to trigger modification of operation of the transmit or the receiver circuitry in the second radio system.

\* \* \* \* \*